(12) United States Patent
May et al.

(10) Patent No.: US 11,487,762 B2
(45) Date of Patent: Nov. 1, 2022

(54) WORKLOAD AWARE DATA PARTITIONING

(71) Applicant: SAP SE, Walldorf (DE)

(72) Inventors: Norman May, Karlsruhe (DE);
Alexander Boehm, Schwetzingen (DE);
Guido Moerkotte, Mannheim (DE);
Michael Brendle, Leimen (DE);
Mahammad Valiyev, Amsterdam (NL);
Nick Weber, Taufkirchen (DE); Robert Schulze, Walldorf (DE); Michael Grossniklaus, Kreuzlingen (CH)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/928,951

(22) Filed: Jul. 14, 2020

(65) Prior Publication Data
US 2022/0019589 A1  Jan. 20, 2022

(51) Int. Cl.
*G06F 16/24* (2019.01)
*G06F 16/2455* (2019.01)
*G06F 16/22* (2019.01)
*G06F 16/27* (2019.01)
*G06F 9/50* (2006.01)

(52) U.S. Cl.
CPC ...... *G06F 16/24554* (2019.01); *G06F 9/5061* (2013.01); *G06F 16/221* (2019.01); *G06F 16/2282* (2019.01); *G06F 16/278* (2019.01)

(58) Field of Classification Search
CPC .................................................. G06F 16/22554
USPC ......................................................... 707/781
See application file for complete search history.

(56) References Cited

U.S. PATENT DOCUMENTS

| | | | |
|---|---|---|---|
| 7,380,035 B1 * | 5/2008 | Donlin | H03K 19/17732 710/116 |
| 2013/0173875 A1 * | 7/2013 | Kim | G06F 12/0246 711/160 |
| 2014/0006401 A1 * | 1/2014 | Levandoski | G06F 16/2282 707/737 |
| 2019/0050436 A1 * | 2/2019 | Deshpande | G06F 16/192 |
| 2020/0012734 A1 | 1/2020 | Lee et al. | |

OTHER PUBLICATIONS

European Search Report received in corresponding European Patent Application No. 20198387.1, dated Mar. 18, 2021, 11 pages.
Hoeppner et al., "An Approach for Hybrid-Memory Scaling Columnar In-Memory Databases," http://www.adms-conf.org/2014/adms14_hoeppner.pdf, Sep. 5, 2014, 10 pages.

(Continued)

*Primary Examiner* — Syling Yen
(74) *Attorney, Agent, or Firm* — Klarquist Sparkman, LLP

(57) ABSTRACT

Techniques and solutions are described for partitioning data among different types of computer-readable storage media, such as between RAM and disk-based storage. A measured workload can be used to estimate data access for one or more possible partition arrangements. The partitions arrangements can be automatically enumerated. Scores for the partition arrangements can be calculated, where a score can indicate how efficiently a partition arrangement places frequently accessed data into storage specified for frequently-accessed data and placed infrequently accessed data into storage specified for infrequently accessed data.

54 Claims, 11 Drawing Sheets

(56) References Cited

OTHER PUBLICATIONS

Grund et al., "Hyrise," Proceedings of the VLDB Endowment [ACM Digital Library], Assoc. of Computing Machinery, New York, NY, vol. 4, No. 2, Nov. 1, 2010, pp. 105-116.
How does cache work on hyperthreaded Intel Xeon processors, Serverfault, https://serverfault.com/questions/559794/how-does-cache-work-on-hyperthreaded-intel-xeon-processors, at least as early as Jul. 14, 2020, 3 pages.
Lecture 11: SMT and Caching Basics, https://www.cs.utah.edu/~rajeev/cs6810/pres/07-6810-11.pdf, at least as early as Jul. 14, 2020, 18 pages.
CPU Topologies, https://docs.openstack.org/nova/pike/admin/cpu-topologies.html, at least as early as Jul. 14, 2020, 10 pages.
Flavors, https://docs.openstack.org/nova/pike/admin/flavors.html#extra-specs-numa-topology, at least as early as Jul. 14, 2020, 13 pages.
Why Hyper-Threading provides 2 virtual cores but not more, Superuser, https://superuser.com/questions/1239592/why-hyper-threading-provides-2-virtual-cores-but-not-more, at least as early as Jul. 14, 2020, 4 pages.
NUMA (non-uniform memory access), https://whatis.techtarget.com/definition/NUMA-non-uniform-memory-access, at least as early as Jul. 14, 2020, 4 pages.
CPU Basics: Multiple CPUs, Cores, and Hyper-Threading Explained, https://www.howtogeek.com/194756/cpu-basics-multiple-cpus-cores-and-hyper-threading-explained/, Oct. 12, 2018, 6 pages.
Simultaneous multithreading, Wikipedia, https://en.wikipedia.org/wiki/Simultaneous_multithreading, at least as early as Jul. 14, 2020, 5 pages.
Non-uniform memory access, Wikipedia, https://en.wikipedia.org/wiki/Non-uniform_memory_access, at least as early as Jul. 14, 2020, 4 pages.
Multicore architectures and CPU affinity, https://blogs.igalia.com/dpino/2015/10/15/multicore-architectures-and-cpu-affinity/, Oct. 15, 2015, 7 pages.
Parekh, Thread-Sensitive Scheduling for SMT Processors, https://dada.cs.washington.edu/smt/papers/threadScheduling.pdf, at least as early as Jul. 14, 2020, 18 pages.
Cache coherence, Wikipedia, https://en.wikipedia.org/wiki/Cache_coherence, at least as early as Jul. 14, 2020, 3 pages.
Is the amount of NUMA nods always equal to sockets? epu—Is the amount of NUMA nodes always equal to sockets?—Super User, at least as early as Jul. 14, 2020, 4 pages.
How are cache memories shared in multicore Intel CPUs, performance—How are cache memories shared in multicore Intel CPUs?—Stack Overflow, at least as early as Jul. 14, 2020, 4 pages.
Hyper-Threading, https://whatis.techtarget.com/definition/Hyper-Threading, Oct. 2006, 3 pages.
Hyper-threading, Wikipedia, https://en.wikipedia.org/wiki/Hyper-threading, at least as early as Jul. 14, 2020, 4 pages.
Lecture 16: Threads, http://wgropp.cs.illinois.edu/courses/cs598-s16/lectures/lecture16.pdf, at least as early as Jul. 14, 2020, 30 pages.
Thread (computing), Wikipedia, https://en.wikipedia.org/wiki/Thread_(computing), at least as early as Jul. 14, 2020, 7 pages.
Abadi et al., "The design and implementation of modern column-oriented database systems," *Foundations and Trends in Databases*, 5(3): 197-280; 2013.
Agrawal et al., "Database tuning advisor for Microsoft SQL server 2005," in Proceedings of the Thirtieth International Conference on Very Large Data Bases—vol. 30, VLDB '04, pp. 1110-1121, VLDB Endowment, 2004.
Agrawal et al., "Integrating vertical and horizontal partitioning into automated physical database design," in *Proceedings of the 2004 ACM SIGMOD International Conference on Management of Data, SIGMOD '04*, pp. 259-370, ACM 2004.
Alagiannis et al., "A hands-free adaptive store," in *Proceedings of the 2014 ACM SIGMOD International Conference of Management of Data, SIGMOD '14*, pp. 1103-1114, New York, NY, USA, 2014, ACM.

Alexiou et al., "Adaptive range filers for cold data: Avoiding trips to Siberia," *Proc. VLDB Endow.*, 6(14):1714-1725, 2013.
Appuswamy et al., "The five minute rule thirty years later and its impact on the storage hierarchy," In *Proceedings of the $7^{th}$ International Workshop on Accelerating Analytics and Data Management Systems Using Modern Processor and Storage Architectures*, 2017, 8 pages.
Arulraj et al., "Bridging the archipelago between row-stores and column-stores for hybrid workloads," In *Proceedings of the 2016 International Conference on Management of Data, SIGMOD '16*, pp. 583-598, Association for Computing Machinery, 2016.
Athanassoulis et al., "Optimal column layout for hybrid workloads," *Proc VLDB Endow.*, (12(13):2393-2407, 2019.
Bentley, Programming Pearls: Tricks of the Trade, *Commun. ACM*, 28(2):138-141, 1985.
Boissier et al., "Hybrid data layouts for tiered HTAP databases with pareto-optimal data placements," In *2018 IEEE $34^{th}$ International Conference on Data Engineering (ICDE)*, pp. 209-220, IEEE, 2018.
Bonez et al., "JCC-H: Adding Join Crossing Correlations with Skew to TPC-H," In *Performance Evaluation and Benchmarking for the Analytics ERA—$9^{th}$ TPC Technology Conference, TPCTC 2017*, pp. 103-119, Aug. 2017.
Bruno et al., "An online approach to physical design tuning," In *2007 IEEE $23^{rd}$ International Conference on Data Engineering*, pp. 826-835, IEEE, 2007.
Cisco.TPC Benchmark H Full Disclosure Report for Cisco UCS C480 M5 Rack-Mount Server using Microsoft SQL Server 2017 Enterprise Edition and Red Hat Enterprise Linux 7.6., http://www.tpc.org/results/fdr/tpch/cisco~tpch~ 10000~cisco_ucs_c480,m5_server~fdr~2019-04-02~v1.pdf, 2019, 37 pages, last accessed on Jan. 14, 2020.
Cormode et al., Synopses for massive data: Samples, histograms, wavelets, sketches, *Foundations and Trends in Databases*, 4(1-3):1-294, 2011.
T.P.P. Council, TPC Benchmark H (decision support) standard specification revision 2.18.0 http://www.tpc.org, 2018, 138 pages.
Curino et al., "A workload-driven approach to database replication and partitioning," *Proc. VLDB Endow*, 3(1-2):48-57, Sep. 2010.
I.DB2 The design advisor https://www.ibm.com/support/knowledgecenter/SSEPGG_11.5.0/com.ibm.db2.luw.admin.perf.doc/doc/c0005144.html, 2020, last accessed on Jan. 20, 2020, 4 pages.
I.DB2 Restrictions, limitations, and unsupported database configurations for column-organized tables. https://www.ibm.com/support/knowledgecenter/SSEPGG_11.5.0/com.ibm.db2.luw.admin.dbobj.doc/doc/c0061528.html, 2020, last accessed on Jan. 1, 2020, 1 page.
DeBrabant et al., "Anti-caching: A new approach to database management system architecture," *Proc. VLDB Endow*, 6(14), 2013.
Dell. TPC Benchmark H Full Disclosure Report Dell Power Edge R6415 using Exasol 6.2, http://www.tpc.org/results/fdr/tpch/dell~tpch~10000~dell_poweredge_r6415~fdr~2019-07-09~v01.pdf, 2019, last accessed on Jan. 14, 2020, 28 pages.
Denning, "The Working Set Model for Program Behavior," *Commun. ACM* 11(5):323-333, 1968.
Eldawy et al., "Trekking through Siberia: Managing cold data in a memory-optimized database," *Proc. VLDB Endow*, 7(11):931-942, 2014.
Funke et al., "Compacting Transactional Data in Hybrid OLTP & OLAP Databases," *Proc. VLDV Endow*, 5(11): 1424-1435, 2012.
Graefe, "The five-minute rule twenty years later, and how flash memory changes the rules," in *Proceedings of the $3^{rd}$ International Workshop on Data Management on New Hardware, DaMoN '07*, pp. 6:1-6:9, ACM, 2007.
Gray et al., "The five-minute rule ten years later, and other computer storage rules of thumb," *SIGMOD Rec.*, 26(4):63-68, 1997.
Gray et al., "The five-minute rule for trading memory for disc accesses and the 10 byte rule for trading memory for CPU time," *SIGMOD Rec.*, 16(3):395-398, 1987.
Hankins et al., "Data morphing: An adaptive, cache-conscious storage technique," in *Proceedings of the $29^{th}$ International Conference on Very Large Data Bases—vol. 29, VLDB '03*, pp. 417-428, VLDB Endowment, 2003.
Harizopoulos et al., "OLTP through the looking glass, and what we found there," *in Proceedings of the 2008 ACM SIGMOD Interna-*

(56) References Cited

OTHER PUBLICATIONS tional Conference on Management of Data, SIGMOD '08, pp. 981-992, Association for Computing Machinery, 2008.
Hellerstein et al., "Architecture of a Database System," *NOW the essence of knowledge*, 119 pages, 2007.
Huang et al., "X-Engine: An optimized storage engine for large-scale e-commerce transaction processing," *in Proceedings of the 2019 International Conference on Management of Data*, SIGMOD '19, pp. 651-665, ACM, 2019.
Idreos et al., "Updating a cracked database," *in Proceedings of the 2007 ACM SIGMOD International Conference on Management of Data*, SIGMOD '07, pp. 413-424, Association for Computing Machinery, 2007.
Idreos et al., "Self-organizing tuple reconstruction in column-stores," *in Proceedings of the 2009 ACM SIGMOD International Conference on Management of Data*, SIGMOD '09, pp. 297-308, Association for Computing Machinery, 2009.
Idreos et al., "Database Cracking," in *CIDR*, pp. 68-78, 2007.
Kemper et al., "HyPer: A hybrid OLTP&OLAP main memory database system based on virtual memory snapshots," *in Proceedings of the 2011 IEEE 27th International Conference on Data Engineering*, ICDE'11, pp. 195-206, IEEE Computer Society, 2011.
Kooi, "The optimization of queries in relational databases," thesis, Case Western Reserve University, 1980, 24 pages.
Leis et al., "How good are query optimizers, really?" *Proc. VLDB Endow.*, 9(3):204-215, 2015.
Leis et al., "LeanStore:In-memory data management beyond main memory," *in 2018 IEEE 34th International Conference on Data Engineering (ICDE)*, pp. 185-196, IEEE, 2018.
Levandoski et al., "Identifying hot and cold data in main-memory databases," *in 2013 IEEE 29th International Conference on Data Engineering (ICDE)*, pp. 26-37, IEEE, 2013.
Lightstone et al., "Physical Database Design: the database professional's guide to exploiting indexes, views, storage and more," Morgan Kaufmann, 2010,cover, copyright and table of contents, 6 pages.
Lomet, "Cost/Performance in Modern Data Stores: How Data Caching Systems Succeed," *in Proceedings of the 14th International Workshop on Data Management on New Hardware*, DAMON '18, pp. 9:1-9:10, ACM, 2018.
May et al., "SAP HANA—the evolution of an in-memory DBMS from pure OLAP processing towards mixed workloads," *in Datenbanksysteme for Business, Technologies and Web (BTW 2017)*, pp. 545-546, 2017.
Moerkotte, "Building Query Compilers," http://pi3.informatik.uni-mannheim.de/~moer/querycompiler.pdf, 2019, 714 pages.
Nehme et al., "Automated partitioning design in parallel database systems," *in Proceedings of the 2011 ACM SIGMOD International Conference on Management of Data*, SIGMOD '11, pp. 1137-1148, New York, NY, USA, 2011, Association for Computing Machinery.
Neumann et al., "A disk-based system with in-memory performance," in *CIDR*, 2020, 7 pages.
Ozmen et al., "Workload-aware storage layout for database systems," *in Proceedings of the 2010 ACM SIGMOD International Conference on Management of Data*, SIGMOD '10, pp. 939-950, ACM, 2010.
O'Neil et al., "The LRU-K page replacement algorithm for database disk buffering," *SIGMOD Rec* 22(2): 297-306, Jun. 1993.
Pavlo et al., "Skew-aware automatic database partitioning in shared-nothing, parallel OLTP systems," *in Proceedings of the 2012 ACM SIGMOD International Conference on Management of Data*, SIGMOD '12, pp. 61-72, Association for Computing Machinery, 2012.
Poosala et al., "Improved histograms for selectivity estimation of range predicates," *in Proceedings of the 1996 ACM SIGMOD International Conference on Management of Data*, SIGMOD '96, pp. 294-305, ACM, 1996.
Qin et al., "Adaptive data skipping in main-memory systems," *in Proceedings of the 2016 International Conference on Management of Data*, SIGMOD '16, pp. 2255-2256, ACM 2016.
Rao et al., "Automating physical database design in a parallel database," *in Proceedings of the 2002 ACM SIGMOD International Conference on Management of Data*, SIGMOD '02, pp. 558-569, Association for Computing Machinery, 2002.
Sacca et al., "Database partitioning in a cluster of processors," *ACM Trans. Database Syst.*, 10(1):29-56, Mar. 1985.
Selinger et al., "Access path selection in a relational database management system," *in Proceedings of the 1979 ACM SIGMOD International Conference on Management of Data*, SIGMOD '79, pp. 23-34, New York, NY, USA, 1979, Association for Computing Machinery.
Serafini et al., Clay: Fine-grained adaptive partitioning for general database schemas, *Proc. VLDB Endow.*, 10(4):445-456, 2016.
Server, "Database engine tuning advisor," https://docs.microsoft.com/en-gb/sql/relational-databases/performance/database-engine-tuning-advisor?view=sql-server-ver15, 2020, last accessed on Jan. 1, 2020, 4 pages.
Services, "Amazon Web Services" https://aws.amazon.com/, 2020, last accessed on Feb. 19, 2020, 3 pages.
Sherkat et al., "Native store extension for SAP HANA," *Proc. VLDB Endow.*, 12(12):2047-2058, Aug. 2019.
Sun et al., "Fine-grained partitioning for aggressive data skipping," in Proceedings of the *2014 ACM SIGMOD International Conference on Management of Data*, SIGMOD '14, ACM, 2014, 12 pages.
Sun et al., "Skipping-oriented partitioning for columnar layouts," *Proc. VLDB Endow*, 10(4):421-423, 2016.
Tan et al., "Choosing a cloud DBMS: Architectures and tradeoffs," *Proc. VLDB Endow*, 12(12):2170-2182, 2019.
Zillo et al., "DB2 design advisor: Integrated automatic physical database design," *in Proceedings of the Thirtieth International Conference on Very Large Data Bases—vol. 30*, VLDB '04, pp. 1087-1097, VLDB Endowment, 2004.

\* cited by examiner

| Attribute 1 | Attribute 2 | Attribute 3 | Attribute 4 | Attribute 5 | Attribute 6 | Attribute 7 |
|---|---|---|---|---|---|---|
| ABCD | 1234 | 1.191 | FALSE | | BLUE | |
| DEFG | | 2.262 | | | | 09:22:45 |
| | 5678 | | TRUE | A6**X | | |
| | | | | | | |

FIG. 2A

| Attribute 1 | Attribute 2 | Attribute 3 | Attribute 4 | Attribute 5 | Attribute 6 | Attribute 7 |
|---|---|---|---|---|---|---|

FIG. 2B

Table 1: Notation for partitioning and workload.

| | |
|---|---|
| $R$ | relation with $n$ attributes |
| $A_i$ | attribute $i$ of $R$ |
| $A_k$ | partition-driving attribute $k$ |
| $S_k$ | partitioning specification for $A_k$ |
| $\mathcal{P}(S_k)$ | partitioning according to $S_k$ |
| $P_j \in \mathcal{P}(S_k)$ | the $j$-th partition of $R$ |
| $D_{i,j}$ | dictionary for column partition $j$ of $A_i$ |
| $C^u_{i,j}$ | uncompressed column partition $j$ of $A_i$ |
| $C^c_{i,j}$ | dict.-compressed column partition $j$ of $A_i$ |
| $C_{i,j}$ | column partition (either compressed or not) |
| $\|\cdot\|$ | storage size in bytes |
| $W$ | workload trace |
| $x_{row}(g, i, t_s)$ | access for $g$-th row of $A_i$ at timestamp $t_s$ |
| $X_{max}(i, j)$ | cumulated maximum row accesses of $C_{i,j}$ |

FIG. 4

Algorithm 1: Optimal Range Partitioning

Memory: cost[d][s]: opt. $-costs for a range partition of d distinct values starting at $v_s \in \Pi_{A_{k''}}^D(R)$.
split[d][s]: opt. border for a range partition of d distinct values starting at $v_s \in \Pi_{A_{k''}}^D(R)$.

1  Function $DP(\mathcal{L}(R, A_k, S_k), k'')$:
2      for $1 \leq d \leq |\Pi_{A_{k''}}^D(R)|$ do
3          for $1 \leq s \leq |\Pi_{A_{k''}}^D(R)| - d + 1$ do
4              $lb \leftarrow v_s;\ ub \leftarrow \infty$
5              if $s + d < |\Pi_{A_{k''}}^D(R)|$ then $ub \leftarrow v_{s+d}$
6              cost[d][s] $\leftarrow$ Est($\mathcal{L}(R, A_k, S_k), k'', v_{lb}, v_{ub}$)
7              split[d][s] $\leftarrow$ d
8              for $1 \leq k < d$ do
9                  if cost[k][s] + cost[d−k][s+k] < cost[d][s]
10                     cost[d][s] $\leftarrow$ cost[k][s]+cost[d−k][s+k]
11                     split[d][s] $\leftarrow$ k 12     $S''_{k''} \leftarrow \{\};\ \text{build}(|\Pi_{A_{k''}}^D(R)|, 1, S''_{k''})$
13     return $(cost[|\Pi_{A_{k''}}^D(R)|][1], S''_{k''})$ 14 Function build($d, s, S''_{k''}$):
15     if split[d][s] = d then $S''_{k''} = S''_{k''} \cup v_s$
16     else
17         build(split[d][s], s, $S''_{k''}$)
18         build(d−split[d][s], s+split[d][s], $S''_{k''}$)

FIG. 7

WORKLOAD AWARE DATA PARTITIONING

FIELD

The present disclosure generally relates to managing data to be stored in different types of computer-readable storage media. Particular implementations provide techniques for determining portions of a data set to be placed into hot or cold storage.

BACKGROUND

Software applications deal with increasingly large volumes of data, yet it is desired to maintain or improve the performance of such software applications. In order to improve performance, increasing amounts of data are being stored in RAM, as opposed to secondary storage technologies such as mechanical or solid state disks. For example, SAP HANA, of SAP SE, of Walldorf, Germany, is an in-memory database system that can provide very fast query performance, including for OLAP queries, even for large datasets. However, given the large volumes of data involved, it can be impractical to maintain all data in memory.

That is, computing resources to hold all data in memory may be unavailable, or prohibitively expensive. Even if all data could be stored in memory, including in a cloud deployment, it may not make sense to do so for data that is not frequently used. That is, it may be acceptable for less-frequently used data to be stored on disk, as a user may find the performance degradation acceptable in view of potential costs savings and low practical impact. Similarly, given a fixed hardware configuration (e.g., a fixed amount of RAM), it may be desirable to improve the allocation of data to RAM, versus other storage technologies, so that the most frequently accessed data, or data otherwise designated as highly important, is in RAM. Thus, there is a continuing need for improved techniques for determining where or how data should be stored.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for partitioning data among different types of computer-readable storage media, such as between RAM and disk-based storage. A measured workload can be used to estimate data access for one or more possible partition arrangements. The partition arrangements can be automatically enumerated. Scores for the partition arrangements can be calculated, where a score can indicate how efficiently a partition arrangement places frequently accessed data into storage specified for frequently-accessed data and placed infrequently accessed data into storage specified for infrequently accessed data.

In one aspect, the present disclosure provides a method of determining a score for a partition arrangement having a plurality of partitions, where the score can represent, for example, a cost associated with implementing the partition arrangement. A plurality of partitions are defined for a data set. In a particular example, the data set is a table of a database, and the partitions can correspond to sets of rows for each of a plurality of columns of the table. Access patterns are determined for the plurality of partitions for a workload that includes a plurality of data access requests. The workload can be a simulated workload, or a workload recorded with respect to another partition arrangement and used to estimate access patterns for a current partition arrangement being evaluated using the method. The access requests can be associated with queries executed during the workload, and an access pattern includes a determination of what data of a partition was accessed at discrete timepoints during the workload.

Based on the access pattern for the given partitions, the given partitions are classified as frequently accessed or infrequently accessed, such as by comparing an access frequency with a threshold access frequency. A first size for a first set of partitions is determined, where the first set includes frequently accessed partitions. A second size for a second set of partitions is determined, where the second set includes infrequently accessed partitions.

A first score is calculated for the first set of partitions using the first size and a first constant specified for frequently accessed data. A second score is calculated for the second set of partitions using the second size and a second constant specified for infrequently accessed data. A total score is calculated as the sum of the first and second scores.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 2A is a diagram illustrating a table having a plurality or rows and a plurality of attributes.

FIG. 2B is a diagram illustrating how the attributes of the table of FIG. 2A can have different access patterns.

FIG. 4 is a table listing a notation used to described certain aspects of disclosed technologies.

FIG. 7 provides pseudocode for an example process of enumerating partition arrangements that can be evaluated using disclosed technologies.

DETAILED DESCRIPTION

Example 1—Overview

Figure 1:
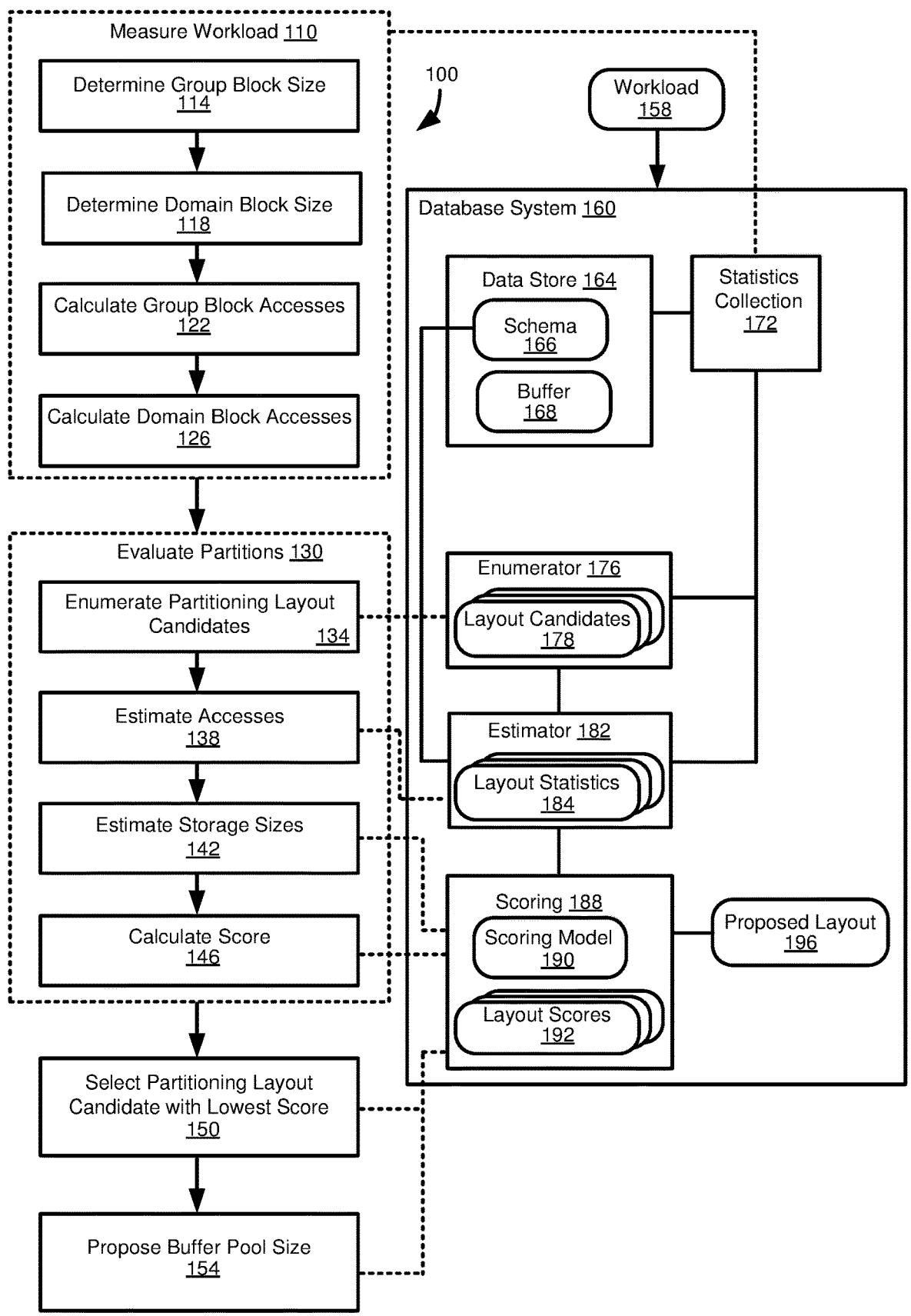
FIG. 1 is a diagram illustrating a process for determining a partition arrangement for placing partitions of a table in hot storage and cold storage.

Software applications deal with increasingly large volumes of data, yet it is desired to maintain or improve the performance of such software applications. In order to improve performance, increasing amounts of data are being stored in RAM, as opposed to secondary storage technologies such as mechanical or solid state disks. For example, SAP HANA, of SAP SE, of Walldorf, Germany, is an in-memory database system that can provide very fast query performance, including for OLAP queries, even for large datasets. However, given the large volumes of data involved, it can be impractical to maintain all data in memory.

That is, computing resources to hold all data in memory may be unavailable, or prohibitively expensive. Even if all data could be stored in memory, including in a cloud deployment, it may not make sense to do so for data that is not frequently used. That is, it may be acceptable for less-frequently used data to be stored on disk, as a user may find the performance degradation acceptable in view of potential costs savings and low practical impact. Similarly, given a fixed hardware configuration (e.g., a fixed amount of RAM), it may be desirable to improve the allocation of data to RAM, versus other storage technologies, so that the most frequently accessed data, or data otherwise designated as highly important, is in RAM. Thus, there is a continuing need for improved techniques for determining where or how data should be stored.

There can be a number of factors to consider when determining what data should be stored computer-readable storage media from which data can be accessed quickly, such as RAM, and computer readable storage media provided slower data access, such as disk-based technologies. Storing all data in RAM may provide the best performance, but, as described above, may be prohibitively expensive, physically impracticable, and unnecessary if some data is not frequently used. Storing data in slower storage technologies can reduce the expense of storing the data, but it can be time consuming to load the data from storage with lower costs, due to the input/output operations involved in finding the needed data and transferring the data into RAM. Disclosed techniques thus seek to better determine what data, which can be referred to as "hot" data, should be maintained in RAM, and what data, "cold" data, that can be stored elsewhere.

Disclosed technologies can be used to partition data between hot and cold storage locations, or to suggest, determine, or evaluate such data partitions. The technologies can evaluate how frequently particular data has been accessed, such as by analyzing queries against a current storage arrangement for the data. For data maintained in a column-store format, analyzing data access during a workload can include tracking accesses to groups of tuples or access to groups of values with the domain of a particular data subset (e.g., a particular column of a table).

Data access statistics determined for one partitioning arrangement can be used to estimate data access for another partitioning arrangement. In some cases, estimating data accesses can include determining a correlation between two data subsets, such as between two table columns.

Estimated data access can be used to classify data partitions in a proposed partitioning arrangement into hot storage or cold storage. A score can be determined for a partitioning arrangement, which can be based at least in part on a weighting factor associated with a given storage media and a size of data to be stored on a given storage media.

In some aspects, multiple partition arrangements can be evaluated. Scores for the different arrangements can be compared, and a partition arrangement having a lowest score can be at least partially automatically implemented, or can be recommended for implementation. In one aspect, a user can select a partition arrangement, and data can be automatically transferred to hot and cold storage to effectuate the selected partition arrangement.

One or more partitions can be automatically enumerated and evaluated. One enumeration technique can iteratively consider partition arrangements having values for a maximum number of distinct values (e.g., tuples) in a partition. This technique then considers scores associated with the different partition sizes to determine an optimized overall partition arrangement. Another enumeration technique can evaluate partitions to determine whether data in a partition has similar access patterns.

Disclosed technologies are generally described in conjunction with column-store database systems. However, at least certain disclosed technologies can more generally be used for partitioning data subsets of a dataset between different types of storage, including for row-store database tables. In the case of row-store database systems, access statistics may be available for rows in the database tables, and so the column partition block counters described in Examples 4 and 5 may not be needed, at least when the row-store is not vertically partitioned. In the case of no vertical partitioning, rather than tracking accesses on a group (or block)-by-group basis for each column, accesses can be tracked on a group-by-group basis considering all columns in a given block. In cases where a row-store database system is vertically partitioned, the column partition block counters can be used for the vertical partitions to help find an optimized vertical partitioning arrangement by placing columns with similar access patterns in the same vertical partition. More generally, a row-store implementation can be considered as having between one vertical partition (e.g., the table is not vertically partitioned) and vertical partitions for each column of the table, where column partition block counters are not needed in the case of a single vertical partition. When a row-store is vertically and horizontally partitioned, disclosed techniques can be used to both horizontally and vertically partition a given table.

Disclosed techniques are generally described as being carried out for a single data set, however, disclosed techniques can be applied to multiple data sets, such as multiple tables in a relational database system. In some aspects, multiple data sets, such as tables, in a database system can be evaluated concurrently, and a partitioning arrangement for multiple tables in the database system can be suggested.

Similarly, the present disclosure generally describes evaluating one data set, such as a table, independently of another data set, such as a different table. However, disclosed technologies can consider relationships between data sets. In the example of a relational database, whether a given data subset is stored in hot or cold storage can depend on what type of storage may be used for data in another data set. Workload characteristics can be determined that identify whether two data sets may be accessed together frequently, or which are otherwise correlated. This determination can include comparing data accesses for multiple tables, evaluating query conditions (e.g., JOINs), evaluating elements of a database schema (such as foreign key relationships or associations between columns of two tables), or a combination of these or other factors.

Example 2—Example Partition Arrangement Determination Process for Storing Frequently and Infrequently Accessed Data FIG. 1 is a flowchart of an example method 100 for determining a partition layout for a data collection, such as a table of a relational database system. The method 100 can be carried out using the database system 160, which processes a workload 158 (including a set of one or more queries that access data in a data store 164 of the database system). The method 100 includes a number of operations that are part of a workload measurement subprocess 110. In a particular example, the subprocess 110 can be carried out by a statistics collection component 172 of the database system 160. In the workload measurement subprocess 110, at 114, a group block size is determined (e.g., a group of rows, which is typically different than row partitions of a current row partitioning arrangement). The group block size is determined for each of a plurality of columns of a table. Each group block includes a contiguous range of tuple (or row) identifier values.

A domain block size is determined at 118. In this context, domain refers to the possible (or in some cases, actual) values present in a column, regardless of in which tuple(s) the value occurs, and regardless of how many tuples have the given value. As an example, a particular table may have 100 rows, and a particular attribute in the table may have values between 1 and 20 (which can be referred to as the domain for the attribute, where the size of the domain can be referred to as the cardinality of the domain). In particular examples, the domain block size is determined at 118 using the actual values present in a column, rather than the domain of all possible values. A partition block size determined at 114 refers to the number of tuples in a block, such as block size of 10, which may result in tuples 0-9 in a first partition block, tuples 10-19 in a second partition block, etc. A domain block size determined at 118 for the attribute determined refers to the number of domain values in a block, such as having values 0 and 1 in one block, values 2 and 3 in another block, etc.

A measured workload is used to determine access patterns, where an access pattern indicates data that is accessed at particular times during execution of the workload. The number of accesses for particular elements of the table during execution of the workload can be determined based on the access pattern. The access pattern can be analyzed to calculate a number of group block accesses (where in this case, the access pattern can be an access frequency, particularly an access frequency of the group block) at 122 for each of the group blocks, and a number of domain block accesses at 126 (e.g., access frequencies for given domain blocks) for each domain block of a set of domain blocks. The workload can be analyzed in real time, or the workload can be a historical workload that is analyzed or is replayed. The workload is measured against a partitioning arrangement, which can be an actual partitioning arrangement or a particular or default partitioning arrangement. If a system has tables that are currently partitioned, including between hot and cold data storage, that partition is typically used for measuring the effect of a workload as part of the subprocess 110. If some or all tables are not partitioned, or if otherwise desired, a partitioning arrangement can be virtually (e.g., logically, such as a simulated partitioning) or physically applied to the tables and the workload performance virtually or physically assessed.

The workload can be defined in terms of timestamps, where a given timestamp can be associated with one or more requests for database operations, such as one or more queries. That is, at any given timestamp, one or more queries may be executing, which may access some or all of the tuples in the table (or a particular column thereof) and may request one or more values for one or more attributes. In some cases, a query can be associated with multiple timestamps (for long running queries), while in other cases a query is associated with a single timestamp. A timestamp for a query can indicate a time at which the query was executed (or a first timestamp where the query was executing), or can be any timestamp at which the query was executing (particularly if different tuples are accessed by the same query, but at different timestamps).

For each timestamp, it is determined at 122 whether particular group blocks (set of tuples) of the set of group blocks were accessed by a query. In at least some embodiments, a given timestamp represents a particular time window or time range of the workload. For example, considering a workload having a duration of one hour, the workload could be split into sixty timestamps, where each timestamp specifies one minute of the workload, or three-thousand six-hundred timestamps, where each timestamp specifies one second of the workload. Typically, time ranges or windows for given timestamps have the same duration. However, in other cases, different time ranges can be defined to have different durations. For each timestamp, it is determined at 126 whether particular domain blocks (value ranges) of a set of domain blocks were accessed.

As will be further described, the access information determined during the subprocess 110 can be used to estimate access patterns for a given partition layout candidate. A score can then be calculated for each candidate partition layout based on scores associated with accessing partitions stored in memory and accessing partitions stored in secondary storage. A partition candidate layout having a lowest score can be selected for implementation, or provided as a recommendation to a user.

One or more, and typically a plurality, of partition layouts are evaluated in a partition evaluation subprocess 130, using the access information determined during the subprocess 110. In at least some aspects, during the partition evaluation subprocess 130, an enumerator 176 can determine layout candidates 178 at 134, including based at least on part on statistics collected by the statistics collection component 172. In other aspects, some or all of partition layouts to be evaluated can be provided by a user. A number of predicted accesses for partitions of a partition layout being evaluated can be estimated at 138 (which can be carried out by an estimator 182 of the database system 160, to produce layout statistics 184, including based at least in part on statistics provided by the statistics collection component 172), and storage sizes for the partitions can be estimated at 142 (such as by a scoring component 188 of the database system 160, which can use a scoring model 190 to provide layout scores 192). The access and storage size information can be used to calculate a score for each partition layout at 146. The score can represent how efficiently a given partition layout splits data between hot storage and cold storage.

At 150, a partition layout candidate 196 having a lowest score can be determined, or selected, such as by the coring component 188. Typically, the partition layout candidate determined at 150 is that having a lowest score of the layout candidates that were enumerated and evaluated during the subprocess 130. Having a lowest score can indicate that, at least among the evaluated candidate layouts, the determined partition candidate layout most efficiently partitions data so that frequently accessed data is stored in hot storage and less frequently accessed data is stored in cold storage.

A buffer pool, or RAM size, for hot storage can be determined at 154, such as by the scoring component 188. Typically, the buffer pool size is equal to the size of data included in the hot partition in the candidate partition layout determined at 150. However, the buffer pool size can be selected to be smaller than this calculated size or larger than this calculated size. A smaller size can be selected, for example, if sufficient RAM is not available for the calculated buffer pool size. A larger size can be selected to provide additional spare capacity or to accommodate other uses of RAM, including to accommodate loading of data cold storage (e.g., data from cold storage is loaded into RAM when needed, and then evicted or transferred back to disk when no longer needed).

A further step in the process can be implementing, automatically, or at least in part based on user action, the partition layout candidate determined at 150, or setting a buffer pool size based on a value determined at 154.

Example 3—Example Table Components Having Different Access Patterns

FIG. 2A illustrates an example table 210. The table 210 has a plurality of attributes 214 (or fields, which serve as columns of the table) and a plurality of rows (or records or tuples) 218. A given row 218 typically has one or more values 222 for one or more of the attributes 214. In addition, rows 218 are typically unique or otherwise distinguishable from one another in some manner, such as using a primary key, which can be based on one or more of the other attributes 214 or can be an artificially assigned/generated value.

As discussed in Example 1, it is typical for data in the table 210 to be accessed differently. Some attributes 214 may be accessed more frequently than others, and some attribute values may be more commonly accessed than other values. Similarly, some rows 218 may be accessed more frequently than others, for one or more attributes 214.

Access patterns for attributes can thus have some relationship, such as rows for a second attribute 214 being accessed when those same rows are accessed with respect to a first attribute. In some cases, the attributes 214 can have some semantic correlation, such as when one attribute represents a city and another attribute represents a country. Access patterns for attributes 214, including access patterns for groups of rows for one or more attributes, and groups of values, can be used for a variety of purposes, including determining access patterns, defining a partitioning arrangement, or assessing an efficiency of a partitioning arrangement. A level of access can also be used to classify accessed data, such as whether particular tuples or particular values for a particular domain (e.g., set of unique values for an attribute) are hot (frequently accessed) or cold (infrequently accessed).

The access pattern of data can be determined or estimated for different components of a table (e.g., the table overall, on a row basis, on an attribute basis, or by partitioning a table by both row and column). FIG. 2B illustrates the table 210, with attributes (table columns) 214 being shaded to represent how often data in a particular column is requested, where darker shading indicates more frequent access (i.e., "hotter" data). It can thus be seen that attribute 214$f$ is accessed infrequently (or not at all), while the data in attribute 214$c$ is most frequently accessed.

Particularly in column store databases, table data is stored in discrete units, rather than being maintained in a single storage or data structure. For example, in a column store database, each attribute 214 may be stored in its own data structure or file. Thus, in one scenario, partitioning is naturally on a column-by-column basis, and columns with frequently accessed data can be stored in faster storage (e.g., RAM) than less frequently accessed data (which can be stored on disk, for example).

Figure 2C:
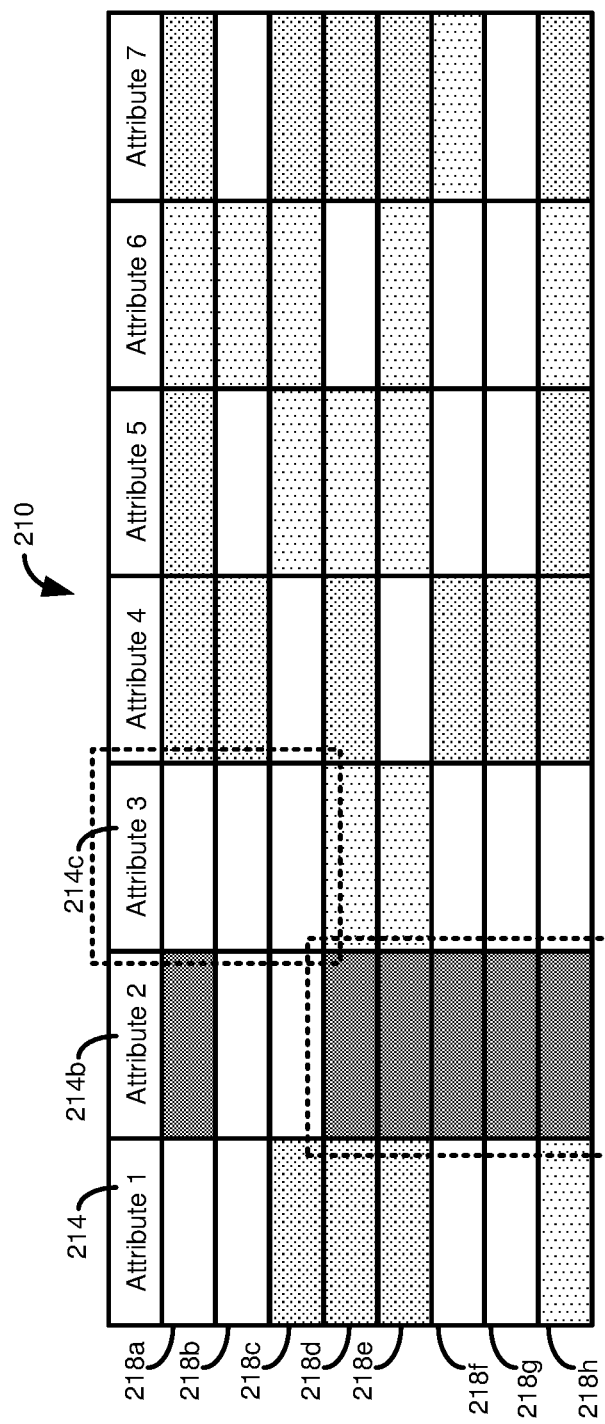
FIG. 2C is a diagram illustrating how, for the table of FIG. 2A, attributes can have some data that is accessed more frequently and some data that is accessed less frequently.

FIG. 2C illustrates the table 210, but with more granularity as to what data is accessed. Even for a single attribute 214, data corresponding to some records can be accessed frequently, while other data may be accessed less frequently (including not being accessed at all). Taking attribute 214$b$ as an example, it can be seen that the data for row 218$a$ and for rows 218$d$-218$h$ is accessed frequently, but data for rows 218$b$ and 218$c$ is accessed less frequently. Thus, partitioning data on an attribute-by-attribute basis can result in less optimal use of storage, as an attribute that is stored in memory may have some values which are not frequently accessed, which wastes memory. However, storing the attribute entirely in secondary storage can result in less optimal performance, if data has to be frequently read from disk. The present disclosure can provide improved use of computing resources, such as by improving the distribution of data such that more frequently accessed data is placed in a partition that is maintained in memory and less frequently accessed data is placed in a partition that is maintained in secondary storage.

Example 4—Example Column Partitions and Techniques for Determining Accesses to Column Partitions and Column Domain Values As explained in the discussion of FIG. 1, disclosed technologies measure access statistics for a data collection, such as data in a table of a relational database system. The data can be for a current partitioning scheme for the table, which can include maintaining the entire table as a single partition, or can include maintaining the table as a collection of attributes (i.e., each attribute, or column of data, serves as a partition, but individual columns are not partitioned into multiple partitions, such as by rows). The table, including when maintained as a collection of attributes, can also be partitioned by rows.

Aspects of disclosed technologies include measuring access statistics for data. For column store databases, it can be useful to track access statistics for values in the domain of the column. For example, if a query specifies a predicate for data that will satisfy the query, values in the domain that match the query will be marked as being accessed. In addition to tracking values in the domain of an attribute that are accessed, it can be useful to track what tuples (or records) of the attribute are accessed.

It may be impractical to track accesses for each row, at least in some implementations, such as when data is stored in a column-store format. In such cases, it can be useful to group rows of the table (to create groups or blocks of rows), and its constituent attributes.

Figure 3:
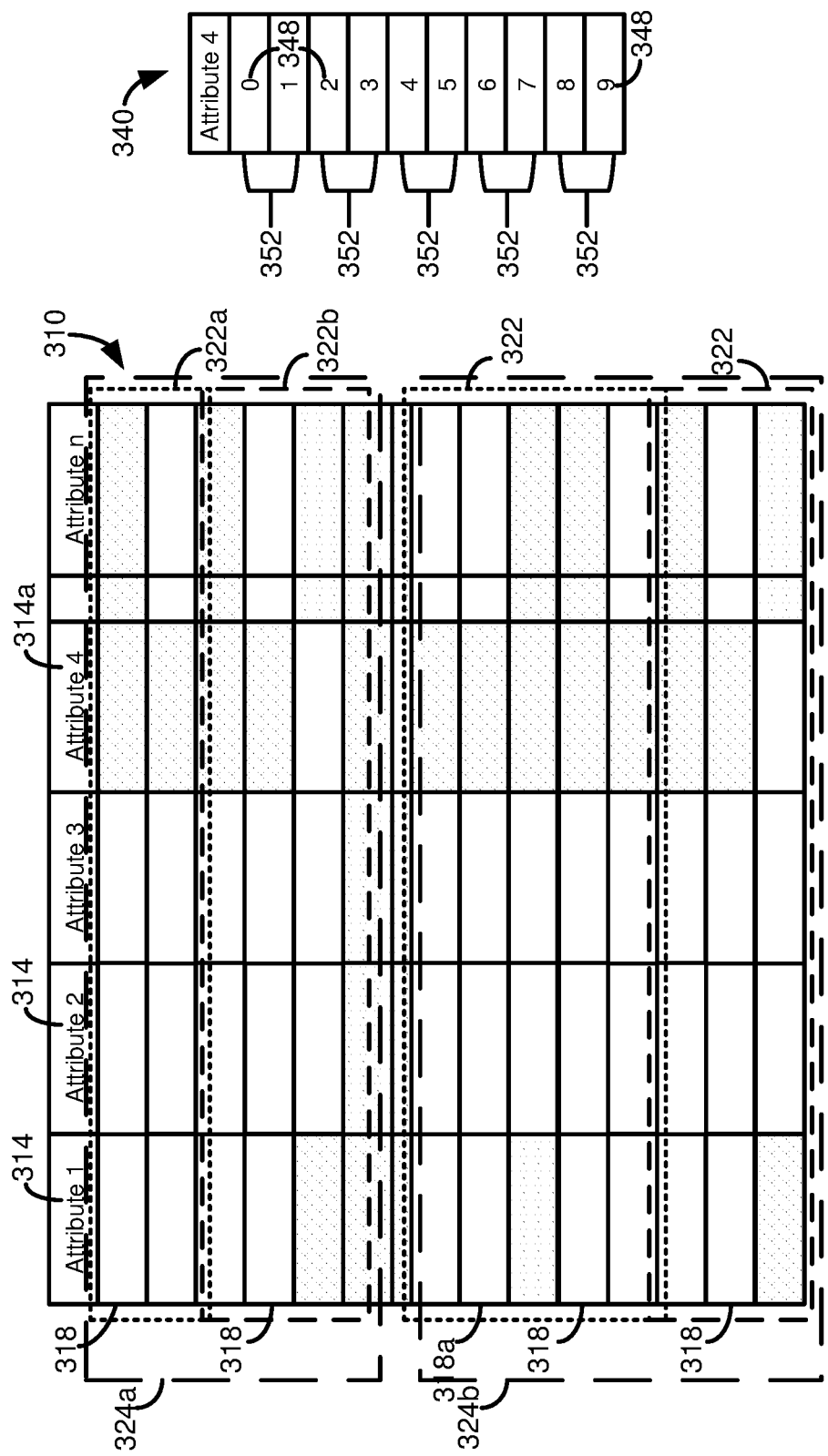
FIG. 3 is a diagram illustrating how multiple row partitions can be created for a table.

Table 310 of FIG. 3 has a plurality of attributes 314 and a plurality of rows 318. The rows 318 can be divided into a plurality of groups 322, where a given group contains one or more rows. In the illustrated example, the groups 322 do not contain the same number of rows. In other examples, the groups 322 can have the same number of rows. However, it may be possible to create groups 322 that more efficiently distribute data between hot and cold storage if the partitions can be of different sizes.

The groups 322 need not correspond to a partition of any existing partitioning arrangement of the table, and the groups typically contain fewer rows than might be used in a horizontal partitioning (partitioning by subsets of rows) of the table. For example, groups 322a, 322b can be part of set of rows used in a partition 324a of the table 310. As will be further described, counters can be associated with the groups 322, and having smaller group sizes for the groups that for partitions used for the table can provide more granular results in determining access patterns for the table 310 (e.g., what data is accessed at what times).

Note that the groups 322 are shown as having the same number of rows 318 for each attribute 314. In other cases, groups 322 are not the same size for each attribute. For example, each attribute 314 may have the same or a different number of groups 322, but, even when the number of partitions is the same, the rows in one partition for a first attribute need not exactly correspond to a partition for another attribute. However, in certain specific examples, the groups 322 are defined the same way for each attribute 314, even though a given group 322 may have different sizes for different attributes, such as if a data type for a first attribute has a larger size than a data type for a second attribute.

Rows 318 can be associated with one or more identifiers, such as to uniquely identify a given row in the table 310, or identify the row with respect to a particular group 322 or partition 324. For example, a row 318 can have a global identifier, which is used to identify a particular row in the table 310 overall. A local identifier can be used to identify a particular row within a specific partition 324. As shown in FIG. 3, a row 318a is the $8^{th}$ row in the table 310, but is the $2^{nd}$ row in the partition 324b.

Counters can be associated with the groups 322. During execution of a workload, for a series of timepoints during the execution, if a record 318 in a group 322 is accessed, an access counter for that group can be set (e.g., a value of 0 can be provided for the group if it was not accessed at a given timepoint, and a value of 1 can be provided if it was accessed at the timepoint). Alternatively, a number of accesses for each group 322 at each timestamp can be tracked (e.g., by incrementing a counter each time an access is determined). Thus, after execution of a workload, the counters provide information regarding how often a particular set of records, corresponding to a group 322, was accessed. Records 318 in a frequently accessed group 322 can be classified as hot data, and records in infrequently accessed groups can be classified as cold data.

As discussed in Example 1, it can also be useful to track how often particular values for a particular domain are accessed. As will be described, data regarding how often particular values in a domain are accessed can be used to partition an attribute, which partitioning may in turn be applied to other attributes. Particularly if the cardinality of an attribute is large, it may be impractical to track access for every value in the domain of an attribute. Thus, attribute values can be grouped into blocks, as shown in the table 340 of FIG. 3.

The table 340 shows values 348 in the domain of attribute 314a. At least a portion of these values 348 would be present in the table 310, and may or may not be ordered by attribute value in the table 310. The values 348 are organized into blocks 352. As opposed to the values 348 as they appear in the table 340, the values are ordered in the blocks 352. As shown, each block 352 contains the same number of values 348. In other cases, blocks 352 can be of different sizes (e.g., a different number of values 348 within the domain of the attribute) even for the same attribute 314, provided that each block has at least one value 348 from the domain.

Domain block counters can be associated with the blocks 352. When a value 348 in a given block 352 is accessed, the counter for that block is set to indicate an access occurred at that timestamp or observation. Thus, when a workload is executed against the table 310, each access of a record 318 (which can be for a single attribute 314 or for multiple attributes) results in setting a counter (or recording an access) for a record group 322 and setting a counter for the domain block corresponding to the values for the specific attributes 314 associated with the access. So, taking an example of a hypothetical table (not the table 340) having five attributes, if a record "23" was accessed for attributes 1 and 4, the counter associated with the group containing record 23 would be set, and the domain block counters for the blocks of attributes 1 and 4 associated with the values in record 23 for attributes 1 and 4 would be set, but the domain block counters for attributes 2, 3, and 5 would not be set.

Example 5—Example Determination of Access Statistics

This Example 5 provides a detailed example of how workload access statistics for a data set, such as a table, can be determined, including for column partition blocks and domain blocks as described more generally in Example 4. This Example 5, as well as other Examples of the present disclosure, uses a notation shown in Table 1 of FIG. 4. Although Examples 5-10 describe the use of disclosed technologies with tables, and where groups (e.g., the groups 322 of FIG. 3) are column partition blocks (particular sets of tuples for a given column), the disclosed techniques can be applied to other types of data groupings (e.g., where the data in a group 322 does not correspond to tuples in a column of a table).

Equation 1, below, can be used to calculate column partition block accesses (again, where a column partition block access is a particular example of a group, such as the groups 322 of FIG. 3) for a given workload trace W (e.g., data regarding records, also referred to as tuples, being accessed by queries at one or more time points, also referred to as timestamps, ts) and a partitioning layout $\mathcal{L}(R, A_k, S_k)$, where R is a relation (or table), $A_k$ is an attribute that drives partitioning of other attributes in the table, and $S_k$ is a current partitioning specification for $A_k$ (e.g., the groups 322 of FIG. 3).

$$x_{stat}(i, j, z, ts) := \begin{cases} 1 & \exists g, q, l : (g, i, q, ts) \in W, l \in [1, |P_j|], \\ & C_{i,j}[l] \cdot gid = g, \lfloor l / CBS_{i,j} \rfloor = z \\ 0 & \text{otherwise.} \end{cases}$$

Equation (1)

Figure 5:
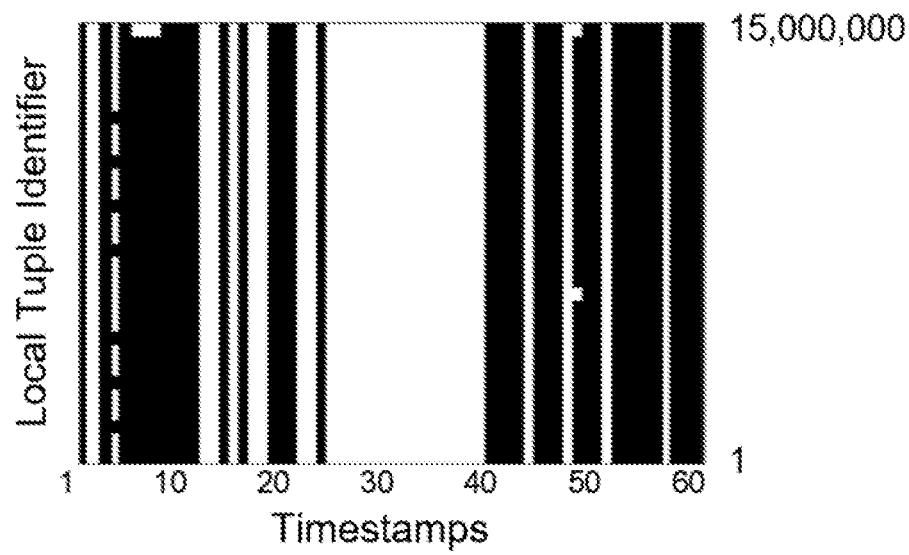
FIG. 5 is a chart illustrating example results of using column partition block counters to track access to column partitions during execution of a workload.

In Equation 1, $x_{stat}$ is the access statistic for a column partition block for an attribute i, a partition (P) number j, and a local block number z, l is an identifier for a local tuple (e.g., a value for a particular record of the table, but using an identifier that allows the tuple to be specifically located in given partition), g is a value of a global tuple identifier (gid) corresponding to the local tuple identifier l (e.g., the identifier of the tuple in the table, overall, as opposed to its local tuple identifier for a partition of the table in which the tuple is located), q is a query in the set of queries at a given timestamp ts, and CBS is the column block size (where a column block size is a specific example of the size of a group 322). A column partition block is accessed at a given timestamp if there exists an operation in the workload trace W that accessed the block at the given timestamp. FIG. 5 is an example showing results of carrying out Equation 1.

A domain block access, $v_{stat}$, can be calculated according to Equation 2. For equation 2, it is assumed that a Boolean function eval(i, v, q) evaluates a value of v of attribute $A_i$ with respect to a conjunction of predicates in a query q's WHERE clause on an attribute $A_i$ (that is, whether a particular value was requested by a query, even if the value was not present in the table).

$$v_{stat}(i, y, ts) := \begin{cases} 1 & \exists g, q, v' : (g, i, q, ts) \in W, eval \in [i, v_u, q], \\ & R[g] \cdot A_i = v_u, \lfloor u/DBS_i \rfloor = y \\ 0 & \text{otherwise.} \end{cases} \quad \text{Equation (2)}$$

Figure 6:
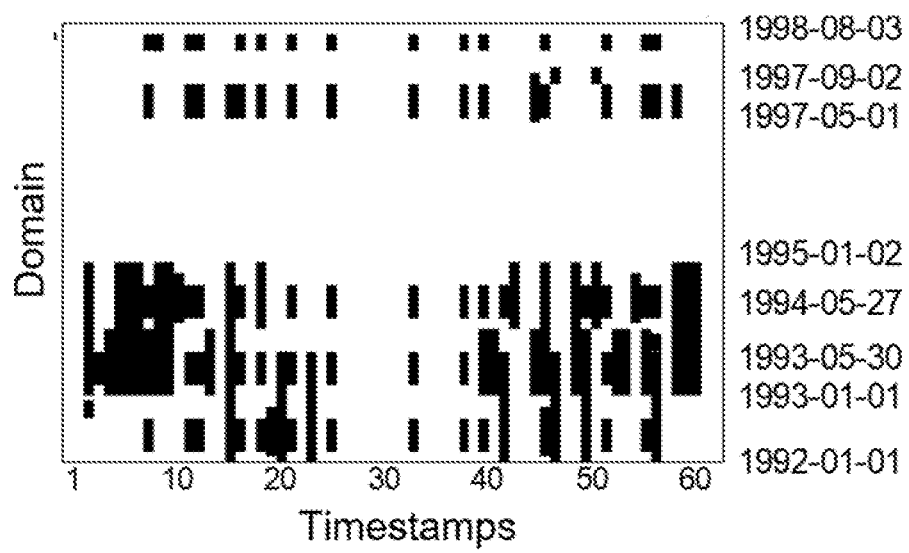
FIG. 6 is a chart illustrating example results of using domain block counters to track access to values in domain blocks during execution of a workload.

In Equation 2, DBS is the domain block size and y is the number of a particular value block for the attribute $A_i$ (e.g., analogous to a blocks 352 of FIG. 3). A domain block is accessed if there exists at least one operation in the workload trace W that satisfies the predicate and is part of the specified domain block. The present disclosure will later describe how domain block counters can be used to estimate accesses for a given range partitioning specification (e.g., one of the specifications being evaluated at 130 in FIG. 1). If the WHERE clause does not satisfy the predicate, it can be assumed that the corresponding range partition will be pruned. FIG. 6 is an example showing results of carrying out Equation 2.

Example 6—Example Estimation of Column Partition Access

Column partition block accesses and domain block accesses recorded for a particular partitioning arrangement and a particular workload can be used to estimate column partition block accesses and domain block accesses for that workload using a different partitioning arrangement, such as at 130 of FIG. 1.

A partitioning layout can have a partition-driving attribute that drives the partitioning for the table, and thus the other, passive, attributes. That is, the domain blocks (groups of domain values) can be determined for the partition-driving attribute, including by sorting rows (or tuples) of the table by the partition-driving attribute (e.g., ascending or descending in value), and applying that order to the passive attributes. The rows of the partition-driving attribute can thus be partitioned by domain value, and that partitioning can be applied to other rows of the table (even though it may result in an ordering for the passive attributes that is not sorted by value for such other attribute). In other cases, a table can be sorted by multiple partition-driving attributes, sequentially, such as sorting first by a first attribute, then sorting by a second attribute, etc. Sorting by multiple attributes can, in some cases, produce a table where frequently and infrequently accessed data are located in larger partitions, which can reduce the chances of hot and cold data being intermixed in a given partition.

For a partition-driving attribute $A_{k''}$ having an upper bound $v_{lb}$ and an upper bound $v_{ub}$, for a partitioning layout $\mathcal{L}$, and a workload trace W, a maximum number of row accesses $\hat{X}_{max}$ can be calculated according to Equation 3:

$$\hat{x}_{max}(k'', v_{lb}, v_{ub}) := \sum_{ts \in TS} \max_{\lfloor lb/DBS_{k''} \rfloor \leq y < \lceil ub/DBS_{k''} \rceil} v_{stat}(k'', y, ts). \quad \text{Equation (3)}$$

For Equation 3, the estimate of an access at a single timestamp depends on whether there is at least one access in a value block that falls into the given partition specific boundaries $v_{lb}$ and $v_{ub}$. If there is no access, it can be assumed that the column partition is pruned.

For a passive attribute, one way $\hat{X}_{max}$ can be estimated is by evaluating the correlation (if any) between the partition-driving attribute and the passive attribute. According to Equation 4, for a given timestamp, if the block counters for the local tuple identifiers of the partition-driving attribute and the passive attribute are similar, it can be assumed that accesses correlate in the new partition. Otherwise, it can be assumed that there is no access correlation in the new partition. According to Equation 4, a local correlation value $\rho_l$ can be calculated as:

$$\rho_l(i, k'', j, l, ts) := \begin{cases} 1 & \text{if } v_{stat}(k'', j, \lfloor l/CBS_{k'',j} \rfloor, ts) \\ & = v_{stat}(i, j, \lfloor l/CBS_{i,j} \rfloor, ts) \\ 0 & \text{otherwise.} \end{cases} \quad \text{Equation (4)}$$

An attribute correlation $\rho_A$ can be defined using $\rho_l$ according to Equation 5 as:

$$\rho_A(i, k'', ts) := \frac{1}{|R|} \cdot \sum_{1 \leq j \leq p} \sum_{1 \leq l \leq |P_j|} \rho_l(i, k'', j, l, ts). \quad \text{Equation (5)}$$

The attribute correlation $\rho_A$ between two attributes is 1 for a positive correlation and 0 for a negative correlation. An attribute correlation of 0.5 indicates that the attributes are independent.

Using the attribute correlation $\rho_A$, $\hat{X}_{max}$ for a passive attribute $A_i$ can be calculated according to Equation 6 as:

$$\hat{X}_{max}(i, k'', v_{lb}, v_{ub}) := \sum_{ts \in TS} \hat{x}_{max}(i, k'', v_{lb}, v_{ub}, ts) \quad \text{Equation (6)}$$

In Equation 6, $\hat{x}_{max}$ can be calculated according to Equation 7 as:

$$\begin{cases} \max_{\lfloor lb/DBS_{k''} \rfloor \leq y < \lceil ub/DBS_{k''} \rceil} v_{stat}(k'', y, ts) & \text{if } \rho_A(i, k'', ts) \geq \epsilon \\ \max_{1 \leq j \leq p} \max_{1 \leq z \leq \lceil \frac{|P_j|}{CBS_{i,j}} \rceil} x_{stat}(i, j, z, ts) & \text{otherwise.} \end{cases} \quad \text{Equation (7)}$$

The estimation of accesses to a passive attribute at a given timestamp ts depends on the attribute correlation $\rho_A$ at ts. If $\rho_A$ is larger than, or equal to, a factor E, the estimated accesses to the passive attribute is equal to the estimate of accesses to the partition. Otherwise, the passive attribute is accessed if there exists at least one access at the timestamp across all partitions. The estimate of $\hat{X}_{max}$ then is computed as the sum of all estimates at all timestamps. The factor of E can be adjusted as needed to improve the accuracy of the estimates. In some examples, a factor of 0.8 for ε can provide robust estimates. In addition, the value of E can be selected based on the properties of a particular system or other parameters. A value of E can also be altered by a user depending on whether more or less aggressive partitioning is desired. Or, accesses can be calculated as described above for non-correlated attributes, but for all passive attributes.

Estimated accesses can be used to determine whether particular column partitions for particular attributes should be classified as hot or cold for a given partitioning arrangement. A score for a partitioning arrangement, which can represent its efficiency, can then be calculated by estimating the sizes of the resulting hot and cold partitions, which is further described in Example 8.

Example 7—Example Alternative Estimation of Column Partition Access

This Example 7 describes an alternative technique for estimating column partition access. The technique of this Example considers different types of relationships between a partition-driving attribute and the passive attributes for the table.

As in Example 6, accesses for the partition-driving attribute $A_{k''}$ can be estimated by leveraging its domain block counters $v_{block}$. The estimate of a maximum row access $\hat{x}_{max}$ for a timestamp ts depends on whether there is at least one access in the domain block counters for ts that falls into the given value range $[v_{lb}, v_{ub}]$ of the range partition boundaries. If there is no access, it can be assumed that the column partition is pruned after partitioning. The cumulated maximum row access $\hat{X}_{max}$ of $A_{k''}$ can be obtained by summing over all timestamps.

Given a partitioning layout $\mathcal{L}(R, A_k, S_k)$, and a workload trace W, the estimate for a maximum row access $\hat{x}_{max}$ for a timestamp ts∈TS (where TS is the set of timestamps in W) for a partition-driving attribute number k'' with range partition specification boundaries $v_{lb}, v_{ub} \in S_{k''} \cup \{\infty\}$ can be defined as:

$$\hat{x}_{max}(k'', v_{lb}, v_{ub}, ts) := \max_{\lfloor lb/DBS_{k''}\rfloor \leq y < \lceil ub/DBS_{k''}\rceil} v_{block}(k'', y, ts) \quad \text{Equation (8)}$$

Based on $\hat{x}_{max}$, the estimate for the cumulated maximum row access $\hat{X}_{max}$ can be defined as:

$$\hat{X}_{max}(k'', v_{lb}, v_{ub}) := \sum_{ts \in TS} \hat{x}_{max}(k'', v_{lb}, v_{ub}, ts) \quad \text{Equation (9)}$$

To estimate accesses for a passive attribute $A_i$ (i.e., not the partition-driving attribute $A_{k''}$), it is considered how the table's partition-driving attribute impacts the passive attribute. The relationship between the partition-driving attribute and a passive attribute is considered because partition pruning can impact accesses to passive attributes, too. Three cases are considered for estimating a maximum row access $\hat{x}_{max}$ for a timestamp ts for a passive attribute $A_i$.

In the first case, the passive attribute was not accessed by a query for ts. It can then be estimated that the passive attribute is not accessed at ts after changing the table partitioning (e.g., as compared with any partitioning that may have already been present in the table). In the second case, the passive attribute was accessed on a higher plan node compared with the partition-driving attribute of a query execution plan for ts. Therefore, the passive attribute was accessed after the partition-driving attribute for ts. Consequently, only a subset of local tuple identifiers for the passive attribute is accessed for ts compared with the partition-driving attribute. The reason only a subset is accessed is that the other local tuple identifiers are not part of the query execution plan anymore. In this case, the already estimated maximum row access $\hat{x}_{max}$ for ts from the partition-driving attribute, which may have pruned the partition, can be used. In the third case, the range partitioning specification of the partition-driving attribute will not prune the column partition of the passive attribute. It can then be assumed that the column partition of the passive attribute is accessed after changing partitioning. The cumulated maximum row access $\hat{X}_{max}$ of the passive attribute $A_i$ can be obtained by summing over all timestamps.

Given a partitioning layout $\mathcal{L}(R, A_k, S_k)$, and a workload trace W, an estimate for maximum row access $\hat{X}_{max}$ for a timestamp ts∈TS can be estimated for a passive attribute number i based on a partition-driving attribute number k''≠i with range partition specification boundaries $v_{lb}, v_{ub} \in S_{k''} \cup \{\infty\}$ by first determining $\hat{x}_{max}$ as described above as:

$$\hat{x}_{max}(i, k'', v_{lb}, v_{ub}, ts) := \quad \text{Equation (10)}$$

$$\begin{cases} 0 & \forall j, z: x_{block}(i, j, z, ts) = 0 \\ \hat{x}_{max}(k'', v_{lb}, v_{ub}, ts) & \forall j, l: x_{block}(i, j, \lfloor l/CBS_{i,j}\rfloor, ts) \\ & \leq x_{block}(k'', j, \lfloor l/CBS_{k'',j}\rfloor, ts) \\ 1 & \text{otherwise.} \end{cases}$$

Based on $\hat{x}_{max}$, the estimate for the cumulated maximum row access $\hat{X}_{max}$ can be defined as:

$$\hat{X}_{max}(i, k'', v_{lb}, v_{ub}) := \sum_{ts \in TS} \hat{x}_{max}(i, k'', v_{lb}, v_{ub}, ts) \quad \text{Equation (11)}$$

Ideally, one query falls into a timestamp ts. In practice, several queries can fall into a timestamp, or one query can span more than one timestamp. Therefore, partition pruning might not precisely be estimated. Furthermore, the length of a timestamp can impact the memory overhead of the statistics collection. In some cases, the duration of a timestamp (which can thus affect the number of timestamps) can be chosen to balance the precision of the estimator and the memory overhead of the statistics collection. In a particular example, the duration of a timestamp (the time range or window associated with a timestamp of a set of timestamps) is π/2, where π is calculated according to Equation 20 of Example 10.

Example 8—Example Estimation of Column Partition Size

As explained in Example 6, the score representing the efficiency of a partitioning arrangement can be calculated once the constituent partitions have been classified as hot or cold, and the size of the resulting partitions has been calculated. This Example 8 describes a process that can be used to estimate partition sizes for a proposed partitioning arrangement.

The size of a partition can depend on whether the partition, at least for a given attribute (column) of the table, will be compressed, such as using dictionary compression, run-length encoding, other compression techniques, or a combination of such compression techniques. Typically, compression is only used when some storage efficiency is gained, and in some cases the storage efficiency must satisfy some other threshold (e.g., to account for any performance loss that may occur in uncompressing the data). As an example, in some implementations, dictionary compression is used if the sum of the size of a compressed column and the size of its dictionary is less than the size of the uncompressed column.

In a particular example, the size of an uncompressed column partition $\widehat{\|C^u\|}$ (where u designates an uncompressed size), partition j, for an attribute $A_i$ given a particular partitioning layout $\mathcal{L}$ and a particular workload W, assuming a partition-driving attribute $A_{k''}$, and having value range boundaries $v_{lb}$, and $v_{ub}$, can be calculated according to Equation 11 as:

$$\widehat{\|C^u\|}(i, k'', v_{lb}, v_{ub}) := \frac{CardEst(k'', v_{lb}, v_{ub})}{|R|} \cdot \sum_{1 \leq j \leq p} \|C^u_{i,j}\|. \quad \text{Equation (11)}$$

In Equation 11, CardEst is the estimate of the cardinality of the partition-driving attribute within a range $v_{lb}$, $v_{ub}$, which can be calculated according to Equation 12 as:

$$CardEst(k'', v_{lb}, v_{ub}) \approx |\sigma_{v_{lb} \leq A_{k''} < v_{ub}}(R)| \quad \text{Equation (12)}$$

where σ is the selection operation.

In Equation 12, the estimate of the uncompressed column partition size depends on the estimated cardinality of the partition and the storage size of all current column partitions for attribute $A_i$. This technique can work particularly well for data types having a fixed size or length, but may be less accurate for variable-length data types (e.g., string), depending on the distribution of short and long values for that attribute in a given data set.

The size of a compressed column partition can be calculated based on both the estimated cardinality of the partition and an estimated number of tuples in the partition. A precise distinct count for a partition-driving attribute $A_{k''}$ (having range partitioning specification boundary $v_{lb}$, $v_{ub}$), giving the number of tuples in a column partition for a given layout L and workload W, can be calculated according to Equation 13 as:

$$d(k'', v_{lb}, v_{ub}) := ub - lb. \quad \text{(Equation 13)}$$

An estimated distinct count d, for a passive attribute can be determined using the precise distinct count d according to Equation 14 as:

$$\hat{d}(i, k'', v_{lb}, v_{ub}) := DvEst(i, k'', v_{lb}, v_{ub}), \quad \text{Equation (14)}$$

where DvEst is the distinct count estimate given a selection predicate σ and is calculated according to Equation 15 as:

$$DvEst(i, k'', v_{lb}, v_{ub}) \approx |\Pi^D_{A_i}(\sigma_{v_{lb} \leq A_{k''} < v_{ub}}(R))| \quad \text{Equation (15)}$$

where $\Pi^D_{A_i}$ is a duplicate-eliminating projection on $A_i$.

The size of a dictionary, $\widehat{\|D\|}$, for an estimated distinct count $\hat{d}$, or a precise distinct count d, can be determined according to Equation 16 as:

$$\widehat{\|D\|}(\hat{d}, i) := \frac{\hat{d}}{\sum_{1 \leq j \leq p} d_{i,j}} \cdot \sum_{1 \leq j \leq p} \|D_{i,j}\|. \quad \text{Equation (16)}$$

With the values calculated using Equations 13-16, the estimated dictionary-compressed column partition size $\widehat{\|C^c\|}$ (c indicates a compressed column partition) for an estimated distinct count $\hat{d}$, or a precise distinct count d, can be determined according to Equation 17 as:

$$\widehat{\|C^c\|}(\hat{d}, k'', v_{lb}, v_{ub}) := \left\lceil \frac{\lceil \log_2(\hat{d}) \rceil}{8} \cdot CardEst(k'', v_{lb}, v_{ub}) \right\rceil. \quad \text{Equation (17)}$$

The estimated-dictionary compressed partition size depends on the number of bits needed to represent all value IDs of the attribute's domain within a column partition. This value is multiplied by the estimated cardinality to obtain the storage size. The estimated column partition size then can be selected as the smaller of the uncompressed and dictionary-compressed column partition sizes.

As explained above, estimated access statistics can be used to classify a column partition as hot or cold for a given partitioning arrangement. Sizes of the column partitions, including as calculated in this Example, can be used to calculate a score associated within storing a given column partition in hot or cold storage (based on the size of the column partition), which in turn can be used to calculate an overall score for a partitioning arrangement.

Example 9—Example Partition Enumeration

Examples 6-8 described how to estimate access statistics to determine whether a given column partition is hot or cold, and to determine the size of a given column partition. This Example 9 provides two techniques that can be used to determine partition arrangements or layouts to be evaluated, such as using the subprocess 130 of FIG. 1 discussed in Example 2. However, other techniques may be used to enumerate one or more partition layouts to be evaluated. In addition, partition layouts can be manually provided for evaluation, alone or in combination with other partition layouts enumerated by some other process (including those described in this Example 9).

One technique for determining partition layouts to evaluate is based on a dynamic programming approach, and can use the algorithm (Algorithm 1) described in the pseudocode 700 of FIG. 7. Algorithm 1 finds an optimal range partitioning specification for a partition-driving attribute number k" using a function DP. For d distinct values, an optimal (or at least optimized) range partitioning is calculated by using the previously calculated optimal range partitioning for d−1 or fewer distinct values. Thus, the optimal range partitioning specification is found iteratively for the partition-driving attribute. For example, partitions are iteratively created and compared using at most 1 distinct value, at most 2 distinct values, up to d distinct values.

DP returns a score (or cost) on the scoring model or function (described in Example 10) and the estimated accesses and storage sizes described in Examples 6-8. Two two-dimensional arrays, "cost" and "split," are used in the pseudocode 700. Array "cost" stores at position [d][s] the optimal scores for a range partitioning with d distinct values and $v_s$ as lower bound of the range. Array "split" stores at position [d][s] the optimal partition border for a range partitioning with d distinct values and $v_s$ as the lower bound of the range.

In the first FOR loop (lines 2 to 11), DP iterates over the number of distinct values for the current range partitioning. In the second FOR loop (lines 3 to 11), DP iterates over all possible starting points for range partitionings of the partition-driving attribute's domain. First, the pseudocode 700 creates range partition borders for a set of d distinct values, starting at value $v_s \in \Pi_{A_{k''}}^D(R)$ (line 4). The upper bound is $v_{s+d}$, or ∞ for the last range (line 5).

Second, DP calls the estimator "Est" that returns the score for a range partition with a single range $[v_s; v_{s+d}]$ as described in Examples 5-8 and 10. Third, the "cost" array is initialized with the scores returned by "Est." Fourth, the "split" array is initialized with d as the number of distinct values for this range partition (lines 6 and 7). Afterward, DP iterates all partition borders between 1 and d−1 to check if it is more beneficial to have a range partition between 1 and d−1 (lines 8 to 11). It uses the previously calculated optimal range partitioning with at most d−1 distinct values.

If it is more beneficial to have a partition border between 1 and d−1, "cost" and "split" are updated accordingly (lines 10 and 11). Finally, DP recursively builds an optimal range partitioning specification using the "split" array and returns the optimal range partitioning specification together with its scores (lines 12 to 13). Lines 14 to 18 show the recursive build of the partition proposal from the "split" array.

Disclosed technologies can use an optimized version of Algorithm 1. Optimized Algorithm 1 only iterates over the value blocks of the collected statistics. Partition borders between two value blocks are only considered if at least one timestamp was accessed differently. These pruning strategies do not impact uncompressed column partitions. Otherwise, two partitions with the same accesses would be generated. Since no dictionary-compression is applied, the storage size does also not decrease.

In contrast, with dictionary-compression, pruning may not find the optimal range partitioning. If values occur only in a single column partition, the storage size decreases because dictionary-compressed column partition requires fewer bits. In some cases, it may be desired to obtain the performance benefit of such an optimized version of Algorithm 1. The performance benefit for the optimized algorithm can be more beneficial than the pruning of the search space. DP nevertheless considers all cases, and therefore finds an optimized range partitioning specification.

DP is quadratic in its calls to the scoring function, depending on the domain size of the partition-driving attribute. In some cases, partitioning candidates can be generated using a heuristics based approach that can be less time and resource intensive, as it depends only on the data access counters but not on the scoring function. Values from the domain of the partition-driving attribute with similar accesses can be grouped using a histogram. Traditional histograms can fail to find range partitioning specifications for hot and cold data. Equi-depth histograms group distinct values with access patterns, such that the cumulated maximum row access $X_{max}$ for each column partition is equal. Therefore, one column partition may consist of both hot and cold values. Maxdiff histograms avoid clustering values with a diverse $X_{max}$ but can fail if the differences in $X_{max}$ between two values are similar for all possible partition borders. Therefore, a MinMaxDiff heuristic is introduced that can overcome drawbacks of traditional histograms with respect to finding a range partitioning specification for hot and cold data.

The MinMaxDiff heuristic groups values into a single range partition, such that the difference between the minimal number of timestamps that all values of the range partition have to access and the maximal number of timestamps that all values of the range partition access, is smaller or equal than a tuning parameter $\Delta \in \mathbb{N}$. The tuning parameter can also be referred to as the MinMaxDiff constraint. For example, assume that there is a workload that has 64 timestamps, and that there are some values in the single partition for the domain that are never accessed, and the value that accessed at the most timestamps is accessed at 40 timestamps, $\Delta$ can be calculated as 40−0=40. If instead no value was accessed at less than 10 timestamps, $\Delta$ would be 40−10=30. While various values of 4 can be used, in some examples, $\Delta$ is constrained to be between 0 and the number of timestamps in a given workload.

Generally, the MinMaxDiff method operates by forming partitions and checking the value of those partitions. If $\Delta$ is less than a threshold (e.g., that calculated using a single partition), the range of the partition can be expanded to the left and right (concurrently or sequentially) until the $\Delta$ threshold is no longer satisfied. The process can then be repeated on values larger than the current partition and for values smaller than the current partition. This process can occur recursively for these larger and smaller partitions, such that the algorithm works its way to the end values of the domain.

In this way, partitions can be created with values that have a similar access pattern, such that it is more likely that a greater proportion of values in a partition will all be hot or will all be cold, to reduce the chance of cold data being intermixed with hot data, or vice versa. The process can also help establish partition boundaries when a transition between hot and cold data is detected (based on a threshold difference in access frequency, $\Delta$, being detected).

The value block having the highest $X_{max}$ is placed into the current range partition. The current range partition is iteratively extended to the left or right with respect to the domain of the partition-driving attribute, such that the MinMaxDiff constraint is still fulfilled. Finally, the heuristic is recursively called on all values smaller than the current range partition and on all values larger than the current range partition. During expansion, a minimal partition cardinality (a minimum number of rows that must be present in any partition, which can be a user-provided parameter) must be satisfied all the time, which can lead to a range partition that does not satisfy the MinMaxDiff constraint. This likely constitutes only a small overhead since at most as many values are added as the minimal partition cardinality. Compared with the optimized range partitioning proposed by function DP of FIG. 7, the MinMaxDiff heuristic does not consider the impact of the partition induced by the partition-driving attribute on the passive attributes. It also depends on a tuning parameter $\Delta$. On large domains, it may be useful to use a combination of DP and MinMaxDiff. First, the MinMaxDiff heuristic runs with a small $\Delta$ to reduce the number of partition border candidates. Afterward, DP runs for the resulting value blocks.

In some cases, a particular attribute can be specified as the partition-driving attribute. Or, the partition-driving attribute can be selected based on particular criteria, such as an attribute having a lowest distinct count (e.g., largest number of repeated domain values), an attribute having a smallest domain, an access frequency for an attribute, or a combination of these and other factors. In other cases, an enumeration process, including the enumeration processes described in this Example 9, can be carried multiple times using different attributes of a relation as the partition-driving attribute. A result of the subprocess 130 of FIG. 1 can be a set of partitions, where each partition is a most efficient partition given for a different partition-driving attribute. A final partitioning can be selected by selecting a partition, and therefore a partition-driving attribute, having a lowest score, or based on other considerations.

Example 10—Example Determination of Scores for Hot and Cold Storage

The Example 10 provides scoring functions that can be used for hot and cold data. However, disclosed technologies can be used with other scoring functions.

A score for hot storage can be calculated as the product of an amount of storage required for data (e.g., a partitioning arrangement, a column partition, a column, etc.) and a constant, which can be a weighting factor. The weighting factor can be related to a cost of the hot storage media (e.g., DRAM), or which otherwise weights a score for a hot storage medium as compared with a score for a cold storage medium. Units for the constant can thus be a value per byte (or MB, GB, TB) of data (e.g., 8 score units per GB).

A scoring function for cold storage can take into account a score related to a size of the cold storage and a score related to a number of access operations to the cold storage (relating to how many accesses to cold storage might be expected for a given workload), which is associated with a factor based on overhead relating to input/output operations (e.g., sending data to, or retrieving data from, a disk-based medium). Cold storage costs can be calculated according to Equation 18 as:

$$C_{cold}(s, X_{max}) = \frac{X_{max}}{\epsilon[\sec]} \cdot \left[ \frac{s[B]}{s_{page}\left[\frac{B}{page}\right]} \right] \cdot c_{iops}\left[ \frac{\beta}{\frac{page}{\sec}} \right] \quad \text{Equation (18)}$$

where β is the constant for the score associated with a per unit measure of cold storage size and $c_{iops}$ can be calculated according to Equation 19 as:

$$c_{iops} = \frac{\beta}{\text{Disk } IOP\left[\frac{page}{\sec}\right]} \quad \text{Equation (19)}$$

and $s_{page}$ is the size of a page in bytes.

In some cases, it can be determined that data (e.g., for a particular column partition) should be kept in hot storage if it is accessed every π seconds, where π is determined based on a particular hardware configuration (including scores that provide weights for storing data in hot storage and storing data in cold storage), and can be calculated according to Equation 20 as:

$$\pi := \frac{1}{\beta} \cdot \frac{\gamma}{\text{Disk } IOP\left[\frac{page}{\sec}\right]} \quad \text{Equation (20)}$$

where β is a score or weighting factor (i.e., a constant value) for hot storage (such as DRAM) and γ is a score or weighting factor (i.e., a constant value) for cold storage (such as disk-based technologies).

A minimal number of accesses, θ, in order for data to be classified as hot can be defined for a workload W having an execution time (or user constraint for an upper bound of the execution time, such as an upper bound specified by a service level agreement with a customer or user of a database system) ε as θ:=ε/π. So, an evaluation function can classify data as hot (e.g., returns true or false) if a number of accesses for a given data set for a given workload is greater than or equal to θ.

Example 11—Example Database Environment

Figure 8:
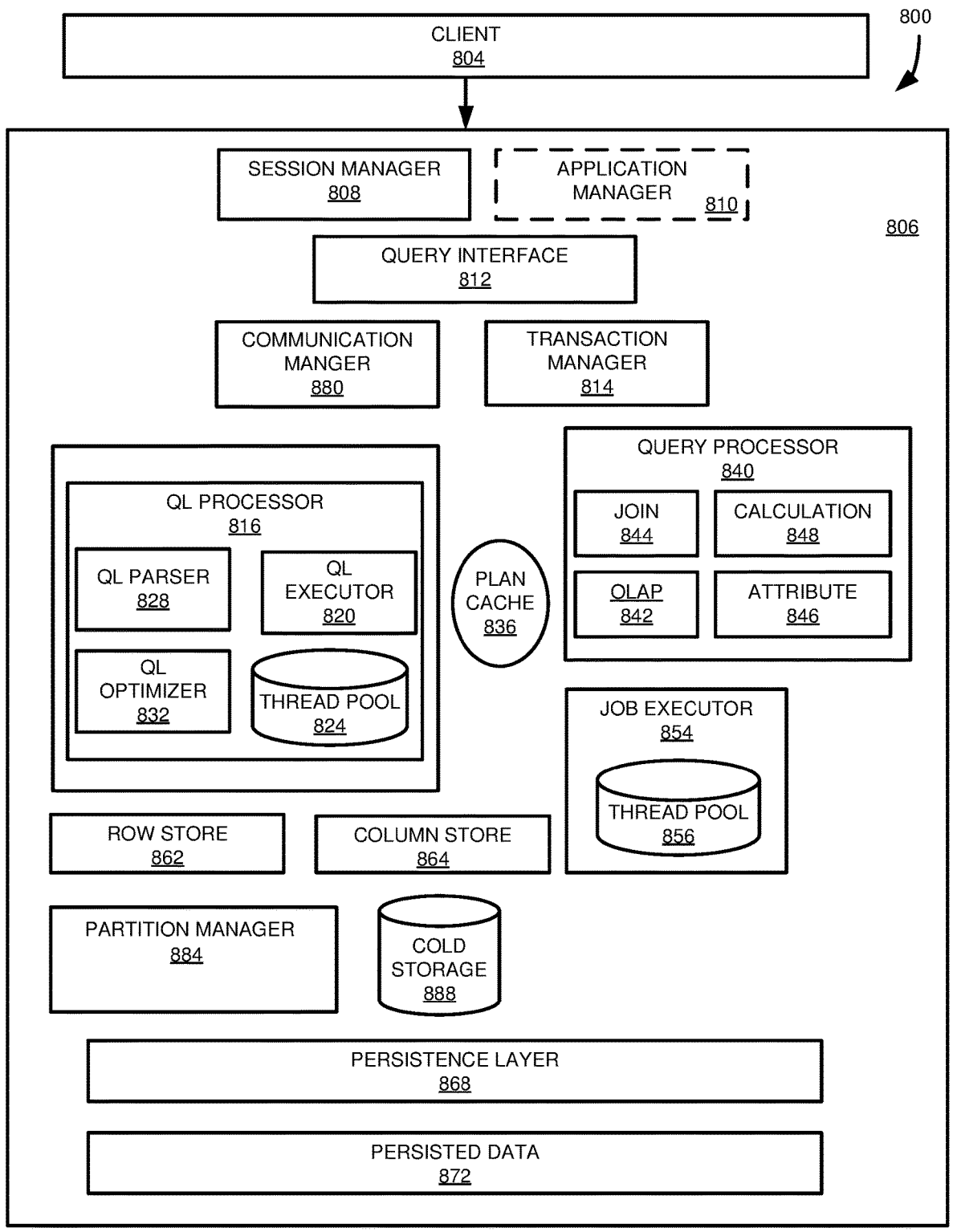
FIG. 8 is a block diagram of an example database environment in which disclosed technologies can be implemented.

FIG. 8 illustrates an example database environment 800 in which disclosed technologies can be implemented. The database environment 800 can include a client 804. Although a single client 804 is shown, the client 804 can represent multiple clients. The client or clients 804 may be OLAP clients, OLTP clients, or a combination thereof.

The client 804 is in communication with a database server 806. Through various subcomponents, the database server 806 can process requests for database operations, such as requests to store, read, or manipulate data. A session manager component 808 can be responsible for managing connections between the client 804 and the database server 806, such as clients communicating with the database server using a database programming interface, such as Java Database Connectivity (JDBC), Open Database Connectivity (ODBC), or Database Shared Library (DBSL). Typically, the session manager 808 can simultaneously manage connections with multiple clients 804. The session manager 808 can carry out functions such as creating a new session for a client request, assigning a client request to an existing session, and authenticating access to the database server 806. For each session, the session manager 808 can maintain a context that stores a set of parameters related to the session, such as settings related to committing database transactions or the transaction isolation level (such as statement level isolation or transaction level isolation).

For other types of clients 804, such as web-based clients (such as a client using the HTTP protocol or a similar transport protocol), the client can interface with an application manager component 810. Although shown as a component of the database server 806, in other implementations, the application manager 810 can be located outside of, but in communication with, the database server 806. The application manager 810 can initiate new database sessions with the database server 806, and carry out other functions, in a similar manner to the session manager 808.

The application manager 810 can determine the type of application making a request for a database operation and mediate execution of the request at the database server 806, such as by invoking or executing procedure calls, generating query language statements, or converting data between formats useable by the client 804 and the database server 806. In particular examples, the application manager 810 receives requests for database operations from a client 804, but does not store information, such as state information, related to the requests.

Once a connection is established between the client 804 and the database server 806, including when established through the application manager 810, execution of client requests is usually carried out using a query language, such as the structured query language (SQL). In executing the request, the session manager 808 and application manager 810 may communicate with a query interface 812. The query interface 812 can be responsible for creating connections with appropriate execution components of the database server 806. The query interface 812 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 814. The transaction manager component 814 can be responsible for operations such as coordinating transactions, managing transaction isolation, tracking running and closed transactions, and managing the commit or rollback of transactions. In carrying out these operations, the transaction manager 814 can communicate with other components of the database server 806.

The query interface 812 can communicate with a query language processor 816, such as a structured query language processor. For example, the query interface 812 may forward to the query language processor 816 query language statements or other database operation requests from the client 804. The query language processor 816 can include a query language executor 820, such as a SQL executor, which can include a thread pool 824. Some requests for database operations, or components thereof, can be executed directly by the query language processor 816. Other requests, or components thereof, can be forwarded by the query language processor 816 to another component of the database server 806. For example, transaction control statements (such as commit or rollback operations) can be forwarded by the query language processor 816 to the transaction manager 814. In at least some cases, the query language processor 816 is responsible for carrying out operations that retrieve or manipulate data (e.g., SELECT, UPDATE, DELETE). Other types of operations, such as queries, can be sent by the query language processor 816 to other components of the database server 806. The query interface 812, and the session manager 808, can maintain and manage context information associated with requests for database operation. In particular implementations, the query interface 812 can maintain and manage context information for requests received through the application manager 810.

When a connection is established between the client 804 and the database server 806 by the session manager 808 or the application manager 810, a client request, such as a query, can be assigned to a thread of the thread pool 824, such as using the query interface 812. In at least one implementation, a thread is associated with a context for executing a processing activity. The thread can be managed by an operating system of the database server 806, or by, or in combination with, another component of the database server. Typically, at any point, the thread pool 824 contains a plurality of threads. In at least some cases, the number of threads in the thread pool 824 can be dynamically adjusted, such in response to a level of activity at the database server 806. Each thread of the thread pool 824, in particular aspects, can be assigned to a plurality of different sessions.

When a query is received, the session manager 808 or the application manager 810 can determine whether an execution plan for the query already exists, such as in a plan cache 836. If a query execution plan exists, the cached execution plan can be retrieved and forwarded to the query language executor 820, such as using the query interface 812. For example, the query can be sent to an execution thread of the thread pool 824 determined by the session manager 808 or the application manager 810. In a particular example, the query plan is implemented as an abstract data type.

If the query is not associated with an existing execution plan, the query can be parsed using a query language parser 828. The query language parser 828 can, for example, check query language statements of the query to make sure they have correct syntax, and confirm that the statements are otherwise valid. For example, the query language parser 828 can check to see if tables and records recited in the query language statements are defined in the database server 806.

The query can also be optimized using a query language optimizer 832. The query language optimizer 832 can manipulate elements of the query language statement to allow the query to be processed more efficiently. For example, the query language optimizer 832 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 836, which can be retrieved (such as by the session manager 808 or the application manager 810) if the query is received again.

Once a query execution plan has been generated or received, the query language executor 820 can oversee the execution of an execution plan for the query. For example, the query language executor 820 can invoke appropriate subcomponents of the database server 806.

In executing the query, the query language executor 820 can call a query processor 840, which can include one or more query processing engines. The query processing engines can include, for example, an OLAP engine 842, a join engine 844, an attribute engine 846, or a calculation engine 848. The OLAP engine 842 can, for example, apply rules to create an optimized execution plan for an OLAP query. The join engine 844 can be used to implement relational operators, typically for non-OLAP queries, such as join and aggregation operations. In a particular implementation, the attribute engine 846 can implement column data structures and access operations. For example, the attribute engine 846 can implement merge functions and query processing functions, such as scanning columns.

In certain situations, such as if the query involves complex or internally-parallelized operations or sub-operations, the query executor 820 can send operations or sub-operations of the query to a job executor component 854, which can include a thread pool 856. An execution plan for the query can include a plurality of plan operators. Each job execution thread of the job execution thread pool 856, in a particular implementation, can be assigned to an individual plan operator. The job executor component 854 can be used to execute at least a portion of the operators of the query in parallel. In some cases, plan operators can be further divided and parallelized, such as having operations concurrently access different parts of the same table. Using the job executor component 854 can increase the load on one or more processing units of the database server 806, but can improve execution time of the query.

The query processing engines of the query processor 840 can access data stored in the database server 806. Data can be stored in a row-wise format in a row store 862, or in a column-wise format in a column store 864. In at least some cases, data can be transformed between a row-wise format and a column-wise format. A particular operation carried out by the query processor 840 may access or manipulate data in the row store 862, the column store 864, or, at least for certain types of operations (such a join, merge, and sub-query), both the row store 862 and the column store 864. In at least some aspects, the row store 862 and the column store 864 can be maintained in main memory.

A persistence layer 868 can be in communication with the row store 862 and the column store 864. The persistence layer 868 can be responsible for actions such as committing write transaction, storing redo log entries, rolling back transactions, and periodically writing data to storage to provided persisted data 872.

In executing a request for a database operation, such as a query or a transaction, the database server 806 may need to access information stored at another location, such as another database server. The database server 806 may include a communication manager 880 component to manage such communications. The communication manger 880 can also mediate communications between the database server 806 and the client 804 or the application manager 810, when the application manager is located outside of the database server.

In some cases, the database server 806 can be part of a distributed database system that includes multiple database servers. At least a portion of the database servers may include some or all of the components of the database server 806. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 806 may need to access other database servers, or other information sources, within the database system. The communication manager 880 can be used to mediate such communications. For example, the communication manager 880 can receive and route requests for information from components of the database server 806 (or from another database server) and receive and route replies.

The database system 800 can include a partition manager 884. The partition manager 884 can carry out all or a portion of the operations in the process 100 of FIG. 1, including causing data partitions to be stored in hot and cold storage. The hot storage can be the row store 862 or the column store 864, which can be located in memory (e.g., RAM). The cold storage can be cold storage 888, and can be computer-readable storage media that has slower performance (and typically a lower cost) than the storage media used for hot storage.

Although shown as part of the same database server 806, computer-readable storage media used for hot storage or for cold storage may be on a different computing device or system than other components of the database server 806. For example, the hot and cold storage can be provided by one or more cloud service providers, or other remote computing systems. In addition, the partition manager 884 can be a component that is not part of the database server 806, but can be part of the database environment 800, such as being located on the client 804 but in communication with the database server.

Example 12—Example Partition Layout Evaluation

Figure 9:
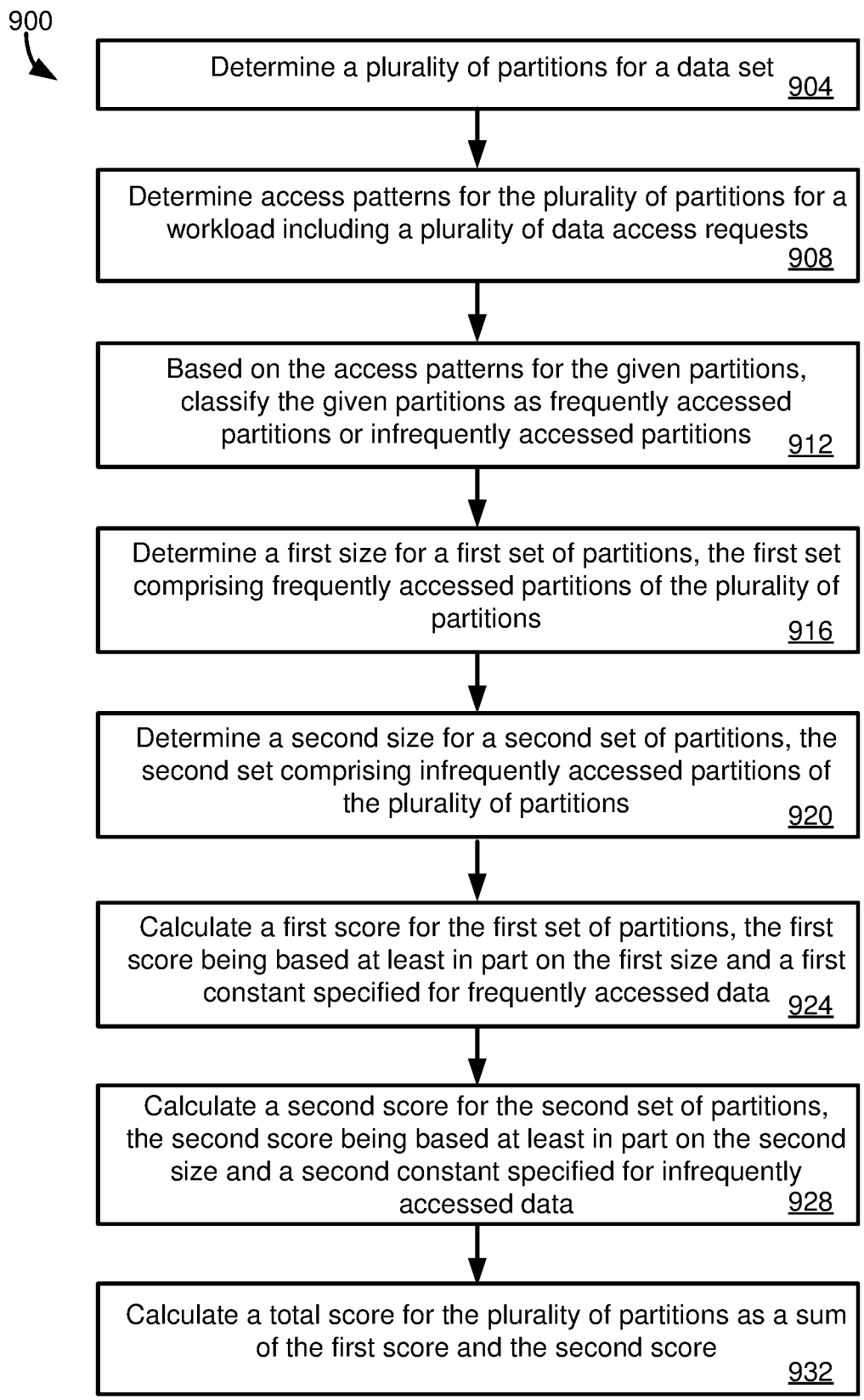
FIG. 9 is a flowchart of an example method for determining a partition arrangement using partition access patterns.

FIG. 9 is a flowchart of a method 900 for determining a score for a partition arrangement having a plurality of partitions, where the score can represent, for example, a cost associated with implementing the partition arrangement. The method 900 can be carried out in the database system 800 of FIG. 8, and can use techniques described in Examples 1-10.

At 904 a plurality of partitions are defined for a data set. In a particular example, the data set is a table of a database, and the partitions can correspond to sets of rows for each of a plurality of columns of the table. Access patterns are determined at 908 for the plurality of partitions for a workload that includes a plurality of data access requests. The workload can be a simulated workload, or a workload recorded with respect to another partition arrangement and used to estimate access patterns for a current partition arrangement being evaluated using the method 900. The access requests can be associated with queries executed during the workload, and an access pattern includes a determination of what data of a partition was accessed at discrete timepoints during the workload.

At 912, based on the access pattern for the given partitions, the given partitions are classified as frequently accessed or infrequently accessed, such as by comparing an access frequency with a threshold access frequency. A first size for a first set of partitions is determined at 916, where the first set includes frequently accessed partitions. A second size for a second set of partitions is determined at 920, where the second set includes infrequently accessed partitions.

At 924, a first score is calculated for the first set of partitions using the first size and a first constant specified for frequently accessed data. A second score is calculated at 928 for the second set of partitions using the second size and a second constant specified for infrequently accessed data. A total score is calculated at 932 as the sum of the first and second scores.

Example 13—Computing Systems

Figure 10:
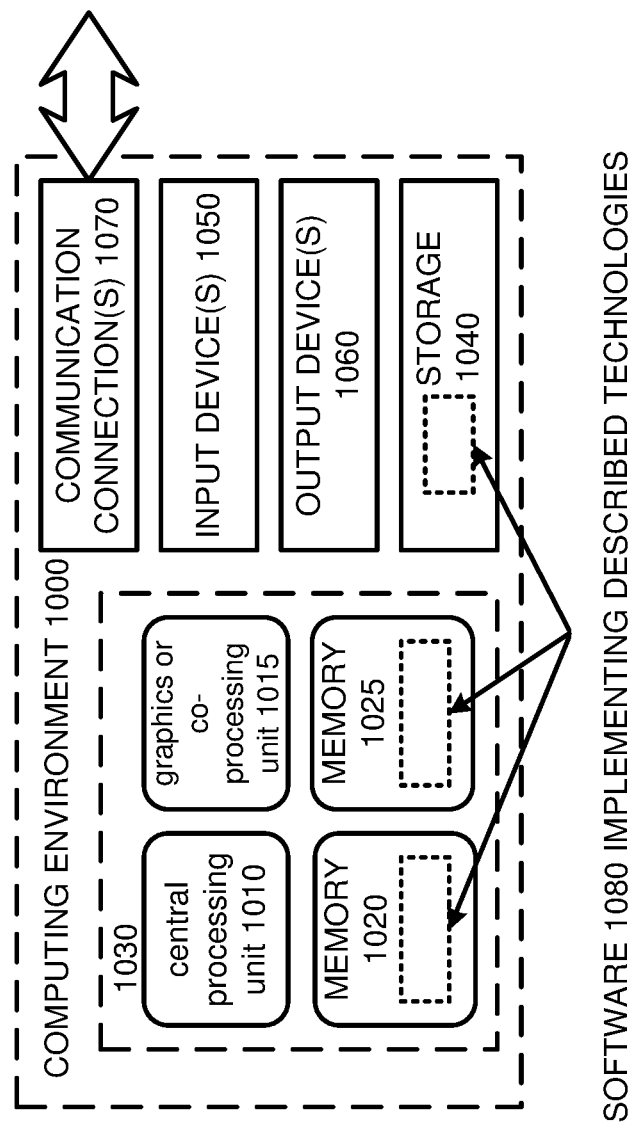
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the features described in Examples 1-12. A processing unit can be a general-purpose central processing unit (CPU), processor in an application-specific integrated circuit (ASIC), a field programmable gate array (FPGA), or any other type of processor, or combination of processors. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070, including input devices, output devices, and communication connections for interacting with a user. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way, and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14—Cloud Computing Environment

Figure 11:
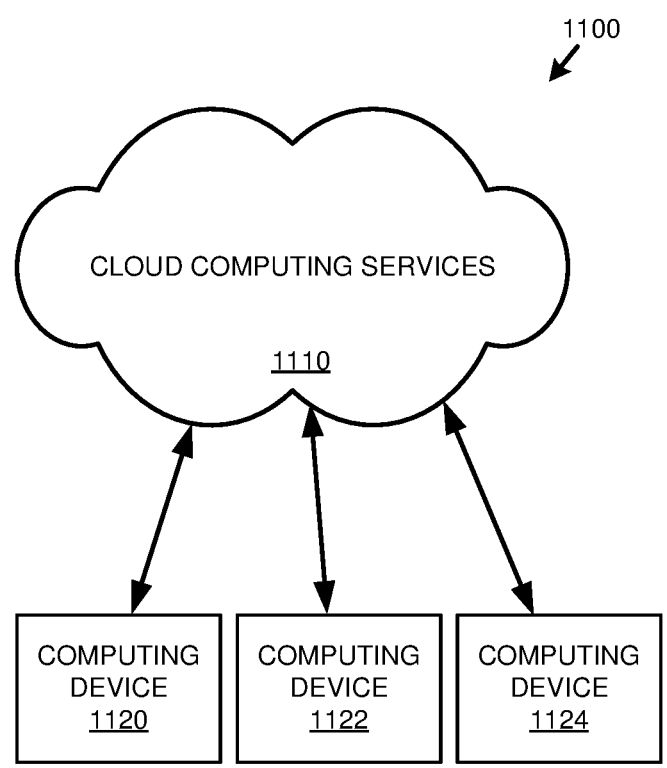
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

Example 15—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   one or more memories;
   one or more hardware processing units coupled to the one or more memories; and
   one or more computer readable storage media storing computer-executable instructions that, when executed, cause the computing system to perform operations comprising:
   determining a plurality of partitions for a data set;
   associating counters with respective data groups of the data set;
   executing a workload using the one or more hardware processing units, the workload comprising a plurality of data access requests, wherein at least a portion of the data access requests are directed to at least a portion of the data set stored in the one or more memories;
   during execution of the workload, incrementing a respective counter when data in a given data group of the data set is accessed by a data access request of the at least a portion of the data access requests directed to the at least a portion of the data set stored in the one or more memories;
   determining access patterns for the plurality of partitions based at least in part on the counters;
   based at least in part on the access patterns for given partitions of the plurality of partitions, classifying the given partitions as frequently accessed partitions or infrequently accessed partitions;
   determining a first size for a first set of partitions of the plurality of partitions, the first set comprising frequently accessed partitions of the plurality of partitions;
   determining a second size for a second set of partitions of the plurality of partitions, the second set comprising infrequently accessed partitions of the plurality of partitions;
   calculating a first score for the first set of partitions, the first score being based at least in part on the first size and a first constant specified for frequently accessed data;
   calculating a second score for the second set of partitions, the second score being based at least in part on the second size and a second constant specified for the infrequently accessed data; and
   calculating a total score for the plurality of partitions as a sum of the first score and the second score.

2. The computing system of claim 1, wherein the plurality of partitions are defined for a plurality of columns of a database table.

3. The computing system of claim 2, wherein the database table is associated with a plurality of rows, given rows of the plurality of rows being associated with row identifiers, and wherein the plurality of partitions comprise first sets corresponding to partitions having a common set of row identifiers for given columns of the plurality of columns.

4. The computing system of claim 3, wherein the plurality of partitions comprise second sets corresponding to given columns of the plurality of columns.

5. The computing system of claim 4, wherein the total score is calculated for a first partition arrangement, the operations further comprising:
   using the access patterns to estimate access patterns of partitions of a second partition arrangement, the second partition arrangement comprising different row identifiers than partitions of the first partition arrangement.

6. The computing system of claim 2, wherein the counters comprise column block counters, wherein a value of a column block counter is set to indicate that a data access event occurred when a data access request accesses a row of a column associated with a given column block counter.

7. The computing system of claim 2, the operations further comprising:
   for at least one column of the plurality of columns, determining a domain of the at least one column;

dividing the domain into a plurality of domain blocks, wherein a given domain block comprises one or more values in the domain, provided that a given value in the domain is associated with a single domain block; and associating domain block counters with the plurality of domain blocks, wherein a value of a domain block counter is set to indicate that a data access event occurred when a data access request accesses a row of the column that comprises a value within an associated domain block.

8. The computing system of claim 2, wherein the counters comprise domain block counters and the operations further comprise:

for at least one column of the plurality of columns, determining a domain of the at least one column;

dividing the domain of the at least one column into a plurality of domain blocks, wherein a given domain block comprises one or more values in the domain, provided that a given value in the domain is associated with a single domain block; and associating the domain block counters with the plurality of domain blocks, wherein a value of a domain block counter is set to indicate that a data access event occurred when a data access request accesses a row of the column that comprises a value within the associated domain block.

9. The computing system of claim 2, wherein the determining access patterns comprises determining a correlation between a first column of the database table and a second column of the database table.

10. The computing system of claim 2, wherein the total score is calculated for a first partition arrangement, the operations further comprising:

determining a number of discrete records for a first column of the plurality of columns; and iteratively defining a third plurality of partitions of the first column for partitions having between at most one distinct value and at most a number of discrete values equal to a cardinality of the column.

11. The computing system of claim 2, wherein the total score is calculated for a first partition arrangement, the operations further comprising:

evaluating values in a domain of a first column of the plurality of columns; and defining a new partition when an access frequency for a value in the domain exceeds a threshold access frequency.

12. The computing system of claim 1, wherein the total score is calculated for a first partition arrangement, the operations further comprising:

automatically enumerating a plurality of partition arrangements, the plurality of partition arrangements comprising the first partition arrangement.

13. The computing system of claim 12, the operations further comprising:

determining total scores for the plurality of partition arrangements; and selecting a partition arrangement of the plurality of partition arrangements having a lowest total score as a recommended partition arrangement.

14. The computing system of claim 13, the operations further comprising:

transferring data associated with the plurality of partitions for the recommended partition arrangement to first storage media for frequently accessed data and second storage media for infrequently accessed data according to the recommended partition arrangement.

15. The computing system of claim 12, wherein the automatically enumerating is carried out using a different attribute of a plurality of attributes of the data set as a partition-driving attribute.

16. The computing system of claim 15, wherein the automatically enumerating is carried out using a dynamic programming approach that considers different partition sizes for the partitions based on the partition-driving attribute.

17. The computing system of claim 1, wherein the classifying the given partitions as frequently accessed partitions or infrequently accessed partitions comprises:

defining a threshold access frequency, wherein the threshold access frequency is defined at least in part based on the product of a weighting factor associated with first storage media used for storing frequently accessed data and the quotient of a weighting factor associated with second storage media used for storing infrequently accessed data and an access speed for retrieving data from the second storage media;

comparing an access frequency for a given partition the threshold access frequency; and based on the comparing, classifying the given partition as a frequently accessed partition when the number of access events satisfies the threshold access frequency and as an infrequently accessed partition otherwise.

18. The computing system of claim 1, wherein the second score is further determined at least in part using an access frequency for a given infrequently accessed partition and the second constant comprises a quotient of a weighting factor associated with second storage media used for storing infrequently accessed data and an access speed for retrieving data from the second storage media.

19. A method, implemented in a computing environment comprising one or more hardware processing units and one or more memories coupled to the one or more hardware processors, comprising:

determining a plurality of partitions for a data set;

associating counters with respective data groups of the data set;

executing a workload using the one or more hardware processing units, the workload comprising a plurality of data access requests, wherein at least a portion of the data access requests are directed to at least a portion of the data set stored in the one or more memories;

during execution of the workload, incrementing a respective counter when data in a given data group of the data set is accessed by a data access request of the at least a portion of the data access requests directed to the at least a portion of the data set stored in the one or more memories;

determining access patterns for the plurality of partitions based at least in part on the counters;

based at least in part on the access patterns for given partitions of the plurality of partitions, classifying the given partitions as frequently accessed partitions or infrequently accessed partitions;

determining a first size for a first set of partitions, the first set comprising frequently accessed partitions of the plurality of partitions;

determining a second size for a second set of partitions, the second set comprising infrequently accessed partitions of the plurality of partitions;

calculating a first score for the first set of partitions, the first score being based at least in part on the first size and a first constant specified for frequently accessed data;

calculating a second score for the second set of partitions, the second score being based at least in part on the second size and a second constant specified for the infrequently accessed data; and calculating a total score for the plurality of partitions as the sum of the first score and the second score.

20. One or more computer-readable storage media comprising:

computer-executable instructions that, when executed by a computing system comprising one or more hardware processing units and one or more memories coupled to the one or more hardware processing units, cause the computing system to determine a plurality of partitions for a data set;

computer-executable instructions that, when executed by the computing system, cause the computing system to associate counters with respective data groups of the data set;

computer-executable instructions that, when executed by the computing system, cause the computing system to execute a workload using the one or more hardware processing units, the workload comprising a plurality of data access requests, wherein at least a portion of the data access requests are directed to at least a portion of the data set stored in the one or more memories;

computer-executable instructions that, when executed by the computing system, cause the computing system to, during execution of the workload, increment a respective counter when data in a given data group of the data set is accessed by a data access request of the at least a portion of the data access requests directed to the at least a portion of the data set stored in the one or more memories;

computer-executable instructions that, when executed by the computing system, cause the computing system to determine access patterns for the plurality of partitions based at least in part on the counters;

computer-executable instructions that, when executed by the computing system, cause the computing system to, based at least in part on the access patterns for given partitions of the plurality of partitions, classify the given partitions as frequently accessed partitions or infrequently accessed partitions;

computer-executable instructions that, when executed by the computing system, cause the computing system to determine a first size for a first set of partitions, the first set comprising frequently accessed partitions of the plurality of partitions;

computer-executable instructions that, when executed by the computing system, cause the computing system to determine a second size for a second set of partitions, the second set comprising infrequently accessed partitions of the plurality of partitions;

computer-executable instructions that, when executed by the computing system, cause the computing system to calculate a first score for the first set of partitions, the first score being based at least in part on the first size and a first constant specified for frequently accessed data;

computer-executable instructions that, when executed by the computing system, cause the computing system to calculate a second score for the second set of partitions, the second score being based at least in part on the second size and a second constant specified for the infrequently accessed data; and computer-executable instructions that, when executed by the computing system, cause the computing system to calculate a total score for the plurality of partitions as the sum of the first score and the second score.

21. The one or more computer-readable storage media of claim 20, wherein the plurality of partitions are defined for a plurality of columns of a database table.

22. The one or more computer-readable storage media of claim 21, wherein the database table is associated with a plurality of rows, given rows of the plurality of rows being associated with row identifiers, and wherein the plurality of partitions comprise first sets corresponding to partitions having a common set of row identifiers for given columns of the plurality of columns.

23. The one or more computer-readable storage media of claim 21, wherein the plurality of partitions comprise second sets corresponding to given columns of the plurality of columns.

24. The one or more computer-readable storage media of claim 23, wherein the total score is calculated for a first partition arrangement, further comprising:

computer-executable instructions that, when executed by the computing system, cause the computing system to use the access patterns to estimate access patterns of partitions of a second partition arrangement, the second partition arrangement comprising different row identifiers than partitions of the first partition arrangement.

25. The one or more computer-readable storage media of claim 21, wherein the counters comprise column block counters, wherein a value of a column block counter is set to indicate that a data access event occurred when a data access request accesses a row of a column associated with a given column block counter.

26. The one or more computer-readable storage media of claim 21, further comprising:

computer-executable instructions that, when executed by the computing system, cause the computing system to, for at least one column of the plurality of columns, determine a domain of the at least one column;

computer-executable instructions that, when executed by the computing system, cause the computing system to divide the domain into a plurality of domain blocks, wherein a given domain block comprises one or more values in the domain, provided that a given value in the domain is associated with a single domain block; and computer-executable instructions that, when executed by the computing system, cause the computing system to associate domain block counters with the plurality of domain blocks, wherein a value of a domain block counter is set to indicate that a data access event occurred when a data access request accesses a row of the column that comprises a value within an associated domain block.

27. The one or more computer-readable storage media of claim 21, wherein the counters comprise domain block counters, further comprising:

computer-executable instructions that, when executed by the computing system, cause the computing system to, for at least one column of the plurality of columns, determine a domain of the at least one column;

computer-executable instructions that, when executed by the computing system, cause the computing system to divide the domain of the at least one column into a plurality of domain blocks, wherein a given domain block comprises one or more values in the domain, provided that a given value in the domain is associated with a single domain block; and computer-executable instructions that, when executed by the computing system, cause the computing system to associate the domain block counters with the plurality of domain blocks, wherein a value of a domain block counter is set to indicate that a data access event occurred when a data access request accesses a row of the column that comprises a value within the associated domain block.

28. The one or more computer-readable storage media of claim 21, wherein the determining access patterns comprises determining a correlation between a first column of the database table and a second column of the database table.

29. The one or more computer-readable storage media of claim 21, wherein the total score is calculated for a first partition arrangement, further comprising:
computer-executable instructions that, when executed by the computing system, cause the computing system to determine a number of discrete records for a first column of the plurality of columns; and
computer-executable instructions that, when executed by the computing system, cause the computing system to iteratively define a third plurality of partitions of the first column for partitions having between at most one distinct value and at most a number of discrete values equal to a cardinality of the column.

30. The one or more computer-readable storage media of claim 21, wherein the total score is calculated for a first partition arrangement, further comprising:
computer-executable instructions that, when executed by the computing system, cause the computing system to evaluate values in a domain of a first column of the plurality of columns; and
computer-executable instructions that, when executed by the computing system, cause the computing system to define a new partition when an access frequency for a value in the domain exceeds a threshold access frequency.

31. The one or more computer-readable storage media of claim 20, wherein the total score is calculated for a first partition arrangement, further comprising:
computer-executable instructions that, when executed by the computing system, cause the computing system to automatically enumerate a plurality of partition arrangements, the plurality of partition arrangements comprising the first partition arrangement.

32. The one or more computer-readable storage media of claim 31, further comprising:
computer-executable instructions that, when executed by the computing system, cause the computing system to determine total scores for the plurality of partition arrangements; and
computer-executable instructions that, when executed by the computing system, cause the computing system to select a partition arrangement of the plurality of partition arrangements having a lowest total score as a recommended partition arrangement.

33. The one or more computer-readable storage media of claim 32, further comprising:
computer-executable instructions that, when executed by the computing system, cause the computing system to transfer data associated with the plurality of partitions for the recommended partition arrangement to first storage media for frequently accessed data and second storage media for infrequently accessed data according to the recommended partition arrangement.

34. The one or more computer-readable storage media of claim 31, wherein the automatically enumerating is carried out using a different attribute of a plurality of attributes of the data set as a partition-driving attribute.

35. The one or more computer-readable storage media of claim 34, wherein the automatically enumerating is carried out using a dynamic programming approach that considers different partition sizes for the partitions based on the partition-driving attribute.

36. The one or more computer-readable storage media of claim 20, wherein the computer-executable instructions that, when executed by the computing system, cause the computing system to the classifying the given partitions as frequently accessed partitions or infrequently accessed partitions comprise:
computer-executable instructions that, when executed by the computing system, cause the computing system to define a threshold access frequency, wherein the threshold access frequency is defined at least in part based on the product of a weighting factor associated with first storage media used for storing frequently accessed data and the quotient of a weighting factor associated with second storage media used for storing infrequently accessed data and an access speed for retrieving data from the second storage media;
computer-executable instructions that, when executed by the computing system, cause the computing system to compare an access frequency for a given partition the threshold access frequency; and
computer-executable instructions that, when executed by the computing system, cause the computing system to, based on the comparing, classify the given partition as a frequently accessed partition when the number of access events satisfies the threshold access frequency and as an infrequently accessed partition otherwise.

37. The one or more computer-readable storage media of claim 20, wherein the second score is further determined at least in part using an access frequency for a given infrequently accessed partition and the second constant comprises a quotient of a weighting factor associated with second storage media used for storing infrequently accessed data and an access speed for retrieving data from the second storage media.

38. The method of claim 19, wherein the plurality of partitions are defined for a plurality of columns of a database table.

39. The method of claim 38, wherein the database table is associated with a plurality of rows, given rows of the plurality of rows being associated with row identifiers, and wherein the plurality of partitions comprise first sets corresponding to partitions having a common set of row identifiers for given columns of the plurality of columns.

40. The method of claim 39, wherein the plurality of partitions comprise second sets corresponding to given columns of the plurality of columns.

41. The method of claim 40, wherein the total score is calculated for a first partition arrangement, the operations further comprising:
using the access patterns to estimate access patterns of partitions of a second partition arrangement, the second partition arrangement comprising different row identifiers than partitions of the first partition arrangement.

42. The method of claim 38, wherein the counters comprise column block counters, wherein a value of a column block counter is set to indicate that a data access event occurred when a data access request accesses a row of a column associated with a given column block counter.

43. The method of claim 38, further comprising:
for at least one column of the plurality of columns, determining a domain of the at least one column;

dividing the domain into a plurality of domain blocks, wherein a given domain block comprises one or more values in the domain, provided that a given value in the domain is associated with a single domain block; and associating domain block counters with the plurality of domain blocks, wherein a value of a domain block counter is set to indicate that a data access event occurred when a data access request accesses a row of the column that comprises a value within an associated domain block.

44. The method of claim 38, wherein the counters comprise domain block counters, further comprising:

for at least one column of the plurality of columns, determining a domain of the at least one column;

dividing the domain of the at least one column into a plurality of domain blocks, wherein a given domain block comprises one or more values in the domain, provided that a given value in the domain is associated with a single domain block; and associating the domain block counters with the plurality of domain blocks, wherein a value of a domain block counter is set to indicate that a data access event occurred when a data access request accesses a row of the column that comprises a value within the associated domain block.

45. The method of claim 38, wherein the determining access patterns comprises determining a correlation between a first column of the database table and a second column of the database table.

46. The method of claim 38, wherein the total score is calculated for a first partition arrangement, further comprising:

determining a number of discrete records for a first column of the plurality of columns; and iteratively defining a third plurality of partitions of the first column for partitions having between at most one distinct value and at most a number of discrete values equal to a cardinality of the column.

47. The method of claim 38, wherein the total score is calculated for a first partition arrangement, further comprising:

evaluating values in a domain of a first column of the plurality of columns; and defining a new partition when an access frequency for a value in the domain exceeds a threshold access frequency.

48. The method of claim 19, wherein the total score is calculated for a first partition arrangement, further comprising:

automatically enumerating a plurality of partition arrangements, the plurality of partition arrangements comprising the first partition arrangement.

49. The method of claim 48, further comprising:

determining total scores for the plurality of partition arrangements; and selecting a partition arrangement of the plurality of partition arrangements having a lowest total score as a recommended partition arrangement.

50. The method of claim 49, further comprising:

transferring data associated with the plurality of partitions for the recommended partition arrangement to first storage media for frequently accessed data and second storage media for infrequently accessed data according to the recommended partition arrangement.

51. The method of claim 48, wherein the automatically enumerating is carried out using a different attribute of a plurality of attributes of the data set as a partition-driving attribute.

52. The method of claim 51, wherein the automatically enumerating is carried out using a dynamic programming approach that considers different partition sizes for the partitions based on the partition-driving attribute.

53. The method of claim 19, wherein the classifying the given partitions as frequently accessed partitions or infrequently accessed partitions comprises:

defining a threshold access frequency, wherein the threshold access frequency is defined at least in part based on the product of a weighting factor associated with first storage media used for storing frequently accessed data and the quotient of a weighting factor associated with second storage media used for storing infrequently accessed data and an access speed for retrieving data from the second storage media;

comparing an access frequency for a given partition the threshold access frequency; and based on the comparing, classifying the given partition as a frequently accessed partition when the number of access events satisfies the threshold access frequency and as an infrequently accessed partition otherwise.

54. The method of claim 19, wherein the second score is further determined at least in part using an access frequency for a given infrequently accessed partition and the second constant comprises a quotient of a weighting factor associated with second storage media used for storing infrequently accessed data and an access speed for retrieving data from the second storage media.

* * * * *